(12) United States Patent
Fujita

(10) Patent No.: US 8,792,260 B2
(45) Date of Patent: Jul. 29, 2014

(54) RECTIFIER CIRCUIT AND SEMICONDUCTOR DEVICE USING THE SAME

(75) Inventor: Masashi Fujita, Machida (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 434 days.

(21) Appl. No.: 13/233,138

(22) Filed: Sep. 15, 2011

(65) Prior Publication Data
US 2012/0075897 A1    Mar. 29, 2012

(30) Foreign Application Priority Data

Sep. 27, 2010   (JP) ................. 2010-215030

(51) Int. Cl.
*H02M 7/217*   (2006.01)
(52) U.S. Cl.
USPC ........................................................ 363/127
(58) Field of Classification Search
CPC .................................................... H02M 7/217
USPC ........................................................ 363/127
See application file for complete search history.

(56) References Cited

U.S. PATENT DOCUMENTS

| | | | |
|---|---|---|---|
| 3,819,951 A * | 6/1974 | Moore | 361/77 |
| 4,139,880 A * | 2/1979 | Ulmer et al. | 361/246 |
| 5,731,856 A | 3/1998 | Kim et al. | |
| 5,744,864 A | 4/1998 | Cillessen et al. | |
| 5,870,031 A * | 2/1999 | Kaiser et al. | 340/10.34 |
| 6,078,512 A * | 6/2000 | Bouvier | 363/127 |
| 6,084,792 A * | 7/2000 | Chen et al. | 363/127 |
| 6,294,274 B1 | 9/2001 | Kawazoe et al. | |
| 6,563,174 B2 | 5/2003 | Kawasaki et al. | |
| 6,727,522 B1 | 4/2004 | Kawasaki et al. | |
| 7,049,190 B2 | 5/2006 | Takeda et al. | |

(Continued)

FOREIGN PATENT DOCUMENTS

| EP | 1737044 A | 12/2006 |
|---|---|---|
| EP | 2226847 A | 9/2010 |

(Continued)

OTHER PUBLICATIONS

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

(Continued)

*Primary Examiner* — Jeffrey Sterrett
(74) *Attorney, Agent, or Firm* — Eric J. Robinson; Robinson Intellectual Property Law Office, P.C.

(57) ABSTRACT

An object is to provide a rectifier circuit of which the drop in the output voltage by the threshold voltage of a transistor used as a rectifier element is suppressed. Another object is to provide a rectifier circuit whose variations in the output voltage are suppressed even in the case where the amplitude of input AC voltage varies greatly. A transistor may be used as a rectifier element in such a way that a gate electrode of the transistor is connected to a second electrode of the transistor through a capacitor, and the potential of the gate electrode is held to be higher than the potential of the second electrode by a difference greater than or equal to the threshold voltage.

11 Claims, 14 Drawing Sheets

(56) References Cited

U.S. PATENT DOCUMENTS

| | | | |
|---|---|---|---|
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,211,825 B2 | 5/2007 | Shih et al | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,443,717 B2 | 10/2008 | Fujita et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,528,327 B2 | 5/2009 | Fujita | |
| 7,674,650 B2 | 3/2010 | Akimoto et al. | |
| 7,732,819 B2 | 6/2010 | Akimoto et al. | |
| 7,782,657 B2 | 8/2010 | Fujita et al. | |
| 7,889,528 B2 | 2/2011 | Shionoiri | |
| 7,929,332 B2 | 4/2011 | Fujita | |
| 8,036,604 B2 | 10/2011 | Fujita et al. | |
| 8,164,933 B2 | 4/2012 | Fujita et al. | |
| 8,259,487 B2 | 9/2012 | Fujita | |
| 8,328,105 B2 | 12/2012 | Fujita | |
| 8,345,401 B2 | 1/2013 | Fujita | |
| 8,409,890 B2 | 4/2013 | Tadokoro et al. | |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0189401 A1 | 10/2003 | Kido et al. | |
| 2003/0218222 A1 | 11/2003 | Wager et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0278716 A1 | 12/2006 | Fujita et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0083969 A1 | 4/2008 | Osada | |
| 2008/0106191 A1 | 5/2008 | Kawase | |
| 2008/0123383 A1* | 5/2008 | Shionoiri | 363/127 |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0225576 A1* | 9/2009 | Zierhofer | 363/127 |
| 2009/0268497 A1* | 10/2009 | Liu et al. | 363/127 |
| 2009/0278122 A1 | 11/2009 | Hosono et al. | |
| 2009/0280600 A1 | 11/2009 | Hosono et al. | |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2011/0101336 A1 | 5/2011 | Yamazaki | |
| 2011/0127338 A1 | 6/2011 | Shionoiri | |
| 2011/0133706 A1 | 6/2011 | Takahashi et al. | |
| 2012/0075897 A1* | 3/2012 | Fujita | 363/127 |
| 2012/0195115 A1 | 8/2012 | Fujita et al. | |
| 2012/0206956 A1 | 8/2012 | Fujita | |
| 2012/0230078 A1 | 9/2012 | Fujita | |
| 2012/0274378 A1 | 11/2012 | Fujita | |
| 2012/0287702 A1 | 11/2012 | Fujita | |
| 2012/0287703 A1 | 11/2012 | Kobayashi et al. | |
| 2012/0293201 A1 | 11/2012 | Fujita et al. | |
| 2012/0299626 A1 | 11/2012 | Fujita et al. | |
| 2013/0162609 A1 | 6/2013 | Miyake et al. | |
| 2013/0201165 A1 | 8/2013 | Fujita | |
| 2013/0297889 A1 | 11/2013 | Fujita | |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-176141 | 6/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| WO | WO-2004/114391 | 12/2004 |

OTHER PUBLICATIONS

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

(56) References Cited

OTHER PUBLICATIONS

Kimizuka.N et al., "Spinel,YBFE2O4, and YB2FE3O7 Types of Structures for Compounds in the In2O3 and SC2O3-A2O3-BO Systems [A; Fe, Ga, or Al; B: Mg, Mn, Fe, Ni, Cu,or Zn] At Temperatures Over 1000 °C,", Journal of Solid State Chemistry, 1985, vol. 60, pp. 382-384.

Nakamura.M et al., "The phase relations in the In2O3-Ga2ZnO4-ZnO system at 1350°C,", Journal of Solid State Chemistry, Aug. 1, 1991, vol. 93, No. 2, pp. 298-315.

Kitzerow.H et al., "Observation of Blue Phases in Chiral Networks,", Liquid Crystals, 1993, vol. 14, No. 3, pp. 911-916.

Kimizuka.N. et al., "Syntheses and Single-Crystal Data of Homologous Compounds, InO3(ZnO)m (m=3, 4, and 5), InGaO3(ZnO)3, and Ga2O3(ZnO)m (m=7, 8, 9, and 16) in the In2O3-ZnGa2O4-ZnO System,", Journal of Solid State Chemistry, Apr. 1, 1995, vol. 116, No. 1, pp. 170-178.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Prins.M et al., "A Ferroelectric Transparent Thin-Film Transistor,", Appl. Phys. Lett. (Applied Physics Letters), Jun. 17, 1996, vol. 68, No. 25, pp. 3650-3652.

Li.C et al., "Modulated Structures of Homologous Compounds InMO3(ZnO)m (M=In,Ga; m=Integer) Described by Four-Dimensional Superspace Group,", Journal of Solid State Chemistry, 1998, vol. 139, pp. 347-355.

Kikuchi.H et al., "Polymer-Stabilized Liquid Crystal Blue Phases,", Nature Materials, Sep. 2, 2002, vol. 1, pp. 64-68.

Tsuda.K et al., "Ultra Low Power Consumption Technologies for Mobile TFT-LCDs ,", IDW '02: Proceedings of the 9th International Display Workshops, Dec. 4, 2002, pp. 295-298.

Nomura.K et al., "Thin-Film Transistor Fabricated in Single-Crystalline Transparent Oxide Semiconductor,", Science, May 23, 2003, vol. 300, No. 5623, pp. 1269-1272.

Ikeda.T et al., "Full-Functional System Liquid Crystal Display Using CG-Silicon Technology,", SID Digest '04: SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Kanno.H et al., "White Stacked Electrophosphorecent Organic Light-Emitting Devices Employing MOO3 as a Charge-Generation Layer,", Adv. Mater. (Advanced Materials), 2006, vol. 18, No. 3, pp. 339-342.

Lee.H et al., "Current Status of, Challenges to, and Perspective View of AM-OLED ,", IDW '06 : Proceedings of the 13th International Display Workshops, Dec. 7, 2006, pp. 663-666.

Hosono.H, "68.3:Invited Paper:Transparent Amorphous Oxide Semiconductors for High Performance TFT,", SID Digest '07: SID International Symposium Digest of Technical Papers, 2007, vol. 38, pp. 1830-1833.

Hirao.T et al., "Novel Top-Gate Zinc Oxide Thin-Film Transistors (ZnO TFTS) for AMLCDS,", Journal of the SID, 2007, vol. No. 1, pp. 17-22.

Park.S et al. "Challenge to Future Displays: Transparent AM-OLED Driven by Peald Grown ZnO TFT,", IMID '07 Digest, 2007, pp. 1249-1252.

Kikuchi.H et al., "62.2:Invited Paper:Fast Electro-Optical Switching in Polymer-Stabilized Liquid Crystalline Blue Phases for Display Application,", SID Digest '07: SID International Symposium Digest of Technical Papers, 2007, vol. 38, pp. 1737-1740.

Miyasaka.M, "Suftla Flexible Microelectronics on Their Way to Business,", SID Digest '07: SID International Symposium Digest of Technical Papers, 2007, vol. 38, pp. 1673-1676.

Kurokawa.Y et al., "UHF RFCPUS on Flexible and Glass Substrates for Secure RFID Systems,", Journal of Solid-State Circuits, 2008, vol. 43, No. 1, pp. 292-299.

Jeong.J et al., "3.1: Distinguished Paper: 12.1-Inch WXGA AMOLED Display Driven by Indium-Gallium-Zinc Oxide TFTs Array,", SID Digest '08: SID International Symposium Digest of Technical Papers, May 20, 2008, vol. 39, No. 1, pp. 1-4.

Lee.J et al., "World's Largest (15-Inch) XGA AMLCD Panel Using IGZO Oxide TFT,", SID Digest '08: SID International Symposium Digest of Technical Papers, May 20, 2008, vol 39, pp. 625-628.

Park.J et al., "Amorphous Indium-Gallium-Zinc Oxide TFTs and their Application for Large Size AMOLED,", AM-FPD '08 Digest of Technical Papers, Jul. 2, 2008, pp. 275-278.

Takahashi.M et al., "Theoretical Analysis of IGZO Transparent Amorphous Oxide Semiconductor,", IDW '08: Proceedings of the 15th International Display Workshops, Dec. 3, 2008, pp. 1637-1640.

Sakata.J et al., "Development of 4.0-In. AMOLED Display with Driver Circuit Using Amorphous In-Ga-Zn-Oxide TFTs,", IDW '09: Proceedings of the 16th International Display Workshops, 2009, pp. 689-692.

Asaoka. Y et al., "29.1:Polarizer-Free Reflective LCD Combined with Ultra Low-Power Driving Technology,", SID Digest '09: SID International Symposium Digest of Technical Papers, May 31, 2009, pp. 395-398.

Nowatari.H et al., "60.2: Intermediate Connector With Suppressed Voltage Loss for White Tandem OLEDS,", SID Digest '09: SID International Symposium Digest of Technical Papers, May 31, 2009, vol. pp. 899-902.

Jin.D et al., "65.2:Distinguished Paper:World-Largest (6.5") Flexible Full Color Top Emission AMOLED Display on Plastic Film and Its Bending Properties,", SID Digest '09: SID International Symposium Digest of Technical Papers, May 31, 2009, pp. 983-985.

Lee.M et al., "15.4:Excellent Performance of Indium-Oxide-Based Thin-Film Transistors by DC Sputtering,", SID Digest '09: SID International Symposium Digest of Technical Papers, May 31, 2009, pp. 191-193.

Cho.D et al., "21.2:Al and Sn-Doped Zinc Indium Oxide Thin Film Transistors for AMOLED Back-Plane,", SID Digest '09: SID International Symposium Digest of Technical Papers, May 31, 2009, pp. 280-283.

Kikuchi.H et al., "39.1:Invited Paper: Optically Isotropic Nano-Structured Liquid Crystal Composites for Display Applications,", SID Digest '09: SID International Symposium Digest of Technical Papers, May 31, 2009, pp. 578-581.

Osada.T et al., "15.2: Development of Driver-Integrated Panel using Amorphous In-Ga-Zn-Oxide TFT,", SID Digest '09: SID International Symposium Digest of Technical Papers, May 31, 2009, pp. 184-187.

Ohara.H et al., "21.3:4.0 In. QVGA AMOLED Display Using In-Ga-Zn-Oxide TFTs With a Novel Passivation Layer,", SID Digest '09: SID International Symposium Digest of Technical Papers, May 31, 2009, pp. 284-287.

Godo.H et al., "P-9:Numerical Analysis on Temperature Dependence of Characteristics of Amorphous In-Ga-Zn-Oxide TFT,", SID Digest '09: SID International Symposium Digest of Technical Papers, May 31, 2009, pp. 1110-1112.

Osada.T et al., "Development of Driver-Integrated Panel Using Amorphous In-Ga-Zn-Oxide TFT,", AM-FPD '09 Digest of Technical Papers, Jul. 1, 2009, pp. 33-36.

Godo.H et al., "Temperature Dependence of Characteristics and Electronic Structure for Amorphous In-Ga-Zn-Oxide TFT,", AM-FPD '09 Digest of Technical Papers, Jul. 1, 2009, pp. 41-44.

Ohara.H et al., "Amorphous In-Ga-Zn-Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Park.J et al., "High performance amorphous oxide thin film transistors with self-aligned top-gate structure,", IEDM 09: Technical Digest of International Electron Devices Meeting, Dec. 7, 2009, pp. 191-194.

Nakamura.M, "Synthesis of Homologous Compound with New Long-Period Structure,", NIRIM Newsletter, Mar. 1, 1995, vol. 150, pp. 1-4.

(56) References Cited

OTHER PUBLICATIONS

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Orita.M et al., "Amorphous transparent conductive oxide InGaO3(ZnO)m (m <4): aZn4s conductor,", Philosophical Magazine, 2001, vol. 81, No. 5, pp. 501-515.

Janotti.A et al., "Oxygen Vacancies In ZnO,", Appl. Phys. Lett. (Applied Physics Letters), 2005, vol. 87, pp. 122102-1-1-122102-3.

Clark.S et al., "First Principles Methods Using Castep,", Zeitschrift fur Kristallographie, 2005, vol. 220, pp. 567-570.

Nomura.K et al., "Amorphous Oxide Semiconductors for High-Performance Flexible Thin-Film Transistors,", JPN. J. Appl. Phys. (Japanese Journal of Applied Physics), 2006, vol. 45, No. 5B, pp. 4303-4308.

Janotti.A at al., "Native Point Defects in ZnO,", Phys. Rev. B (Physical Review. B), Oct. 4, 2007, vol. 76, No. 16, pp. 165202-1-165202-22.

Lany.S at al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J at al., "Improvements in the Device Characteristics of Amorphous Indium Gallium Zinc Oxide Thin-Film Transistors by Ar Plasma Treatment,", Appl. Phys. Lett. (Applied Physics Letters), Jun. 26, 2007, vol. 90, No. 26, pp. 262106-1-262106-3.

Park.J et al., "Electronic Transport Properties of Amorphous Indium-Gallium-Zinc Oxide Semiconductor Upon Exposure to Water,", Appl. Phys. Lett. (Applied Physics Letters), 2008, vol. 92, pp. 072104-1-072104-3.

Hsieh.H et al., "P-29:Modeling of Amorphous Oxide Semiconductor Thin Film Transistors and Subgap Density of States,", SID Digest '08: SID International Symposium Digest of Technical Papers, 2008, vol. 39, pp. 1277-1280.

Oba.F et al., "Defect energetics in ZnO: A hybrid Hartree-Fock density functional study,", Phys. Rev. B (Physical Review. B), 2008, vol. 77, pp. 245202-1-245202-6.

Kim.S et al., "High-Performance oxide thin film transistors passivated by various gas plasmas,", 214th ECS Meeting, 2008, No. 2317, ECS.

Hayashi.R et al., "42.1: Invited Paper: Improved Amorphous In-Ga-Zn-0 TFTs,", SID Digest '08: SID International Symposium Digest of Technical Papers, May 20, 2008, vol. 39, pp. 621-624.

Son.K et al., "42.4L: Late-News Paper: 4 Inch QVGA AMOLED Driven by the Threshold Voltage Controlled Amorphous Gizo (Ga2O3-In2O3-ZnO) TFT,", SID Digest '08: SID International Symposium Digest of Technical Papers, May 20, 2008, vol. 39, pp. 633-636.

Park.Sang-Hee et al., "42.3: Transparent ZnO Thin Film Transistor for the Application of High Aperture Ratio Bottom Emission AM-OLED Display,", SID Digest '08: SID International Symposium Digest of Technical Papers, May 20, 2008, vol. 39, pp. 629-632.

Fung.T et al., "2-D Numerical Simulation of High Performance Amorphous In-Ga-Zn-O TFTs for Flat Panel Displays,", AM-FPD '08 Digest of Technical Papers, Jul. 2, 2008, pp. 251-252, The Japan Society of Applied Physics.

Mo.Y et al., "Amorphous Oxide TFT Backplanes for Large Size AMOLED Displays,", IDW '08: Proceedings of the 6th International Display Workshops, Dec. 3, 2008, pp. 581-584.

Asakuma.N. et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.

Fortunato.E et al., "Wide-Bandgap High-Mobility ZnO Thin-Film Transistors Produced At Room Temperature,", Appl. Phys. Lett. (Applied Physics Letters), Sep. 27, 2004, vol. 85, No. 13, pp. 2541-2543.

Masuda.S et al., "Transparent thin film transistors using ZnO as an active channel layer and their electrical properties,", J. Appl. Phys. (Journal of Applied Physics), Feb. 1, 2003, vol. 93, No. 3, pp. 1624-1630.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Ueno.K et al., "Field-Effect Transistor on SrTiO3 With Sputtered Al2O3 Gate Insulator,", Appl. Phys. Lett. (Applied Physics Letters), Sep. 1, 2003, vol. 83, No. 9, pp. 1755-1757.

Nomura.K at al., "Carrier transport in transparent oxide semiconductor with intrinsic structural randomness probed using single-crystalline InGaO3(ZnO)5 films,", Appl. Phys. Lett. (Applied Physics Letters), Sep. 13, 2004, vol. 85, No. 11, pp. 1993-1995.

\* cited by examiner

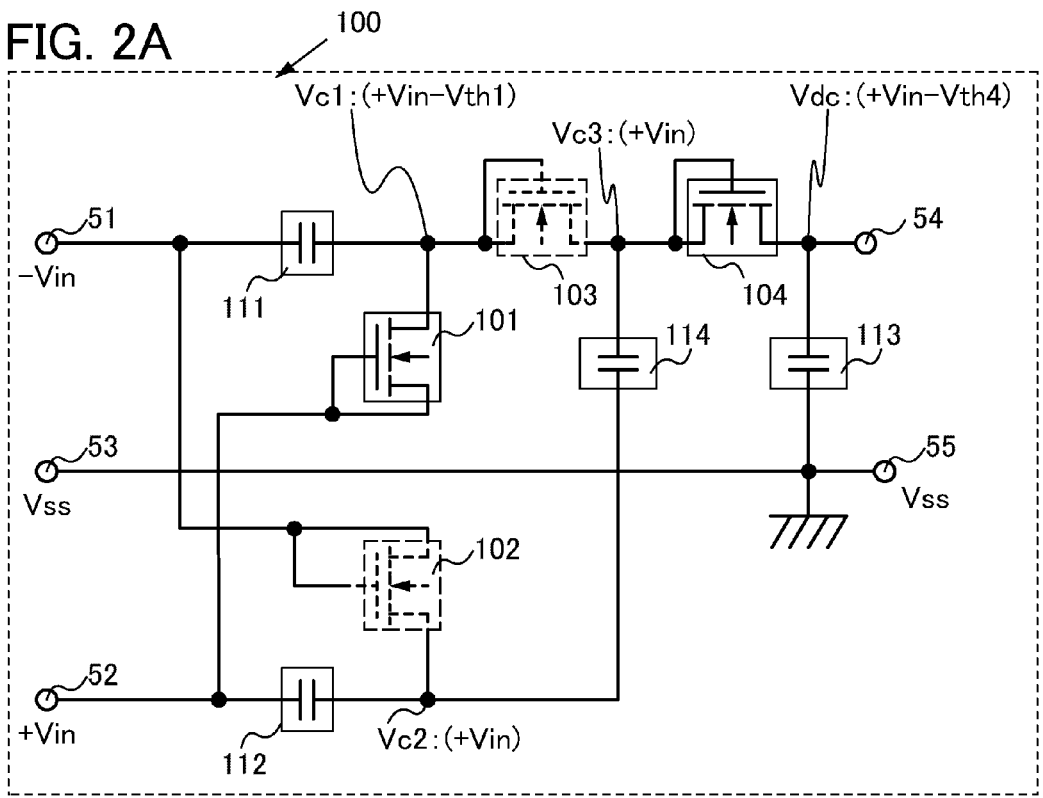
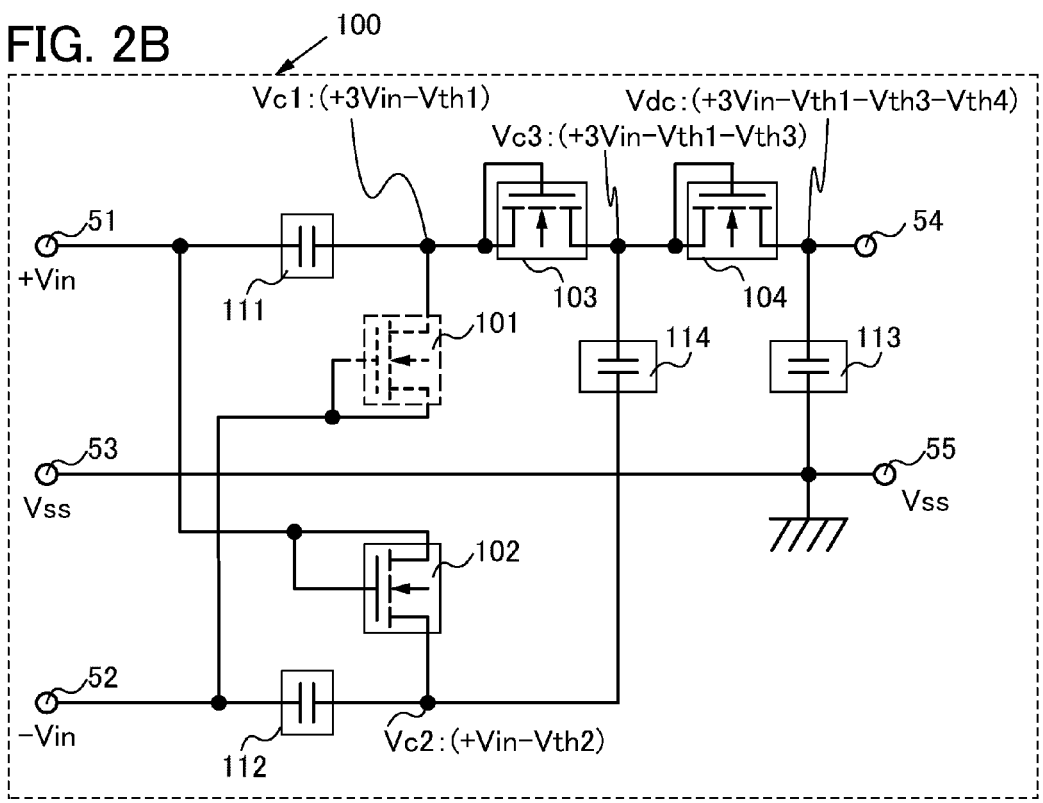

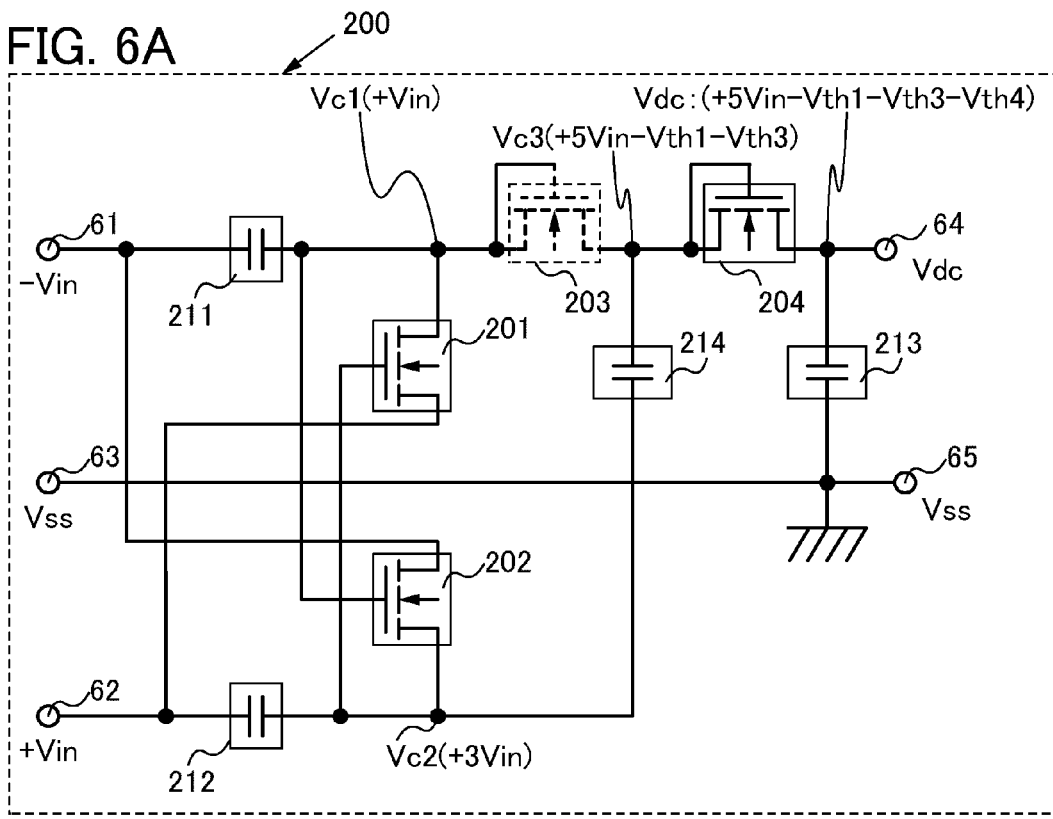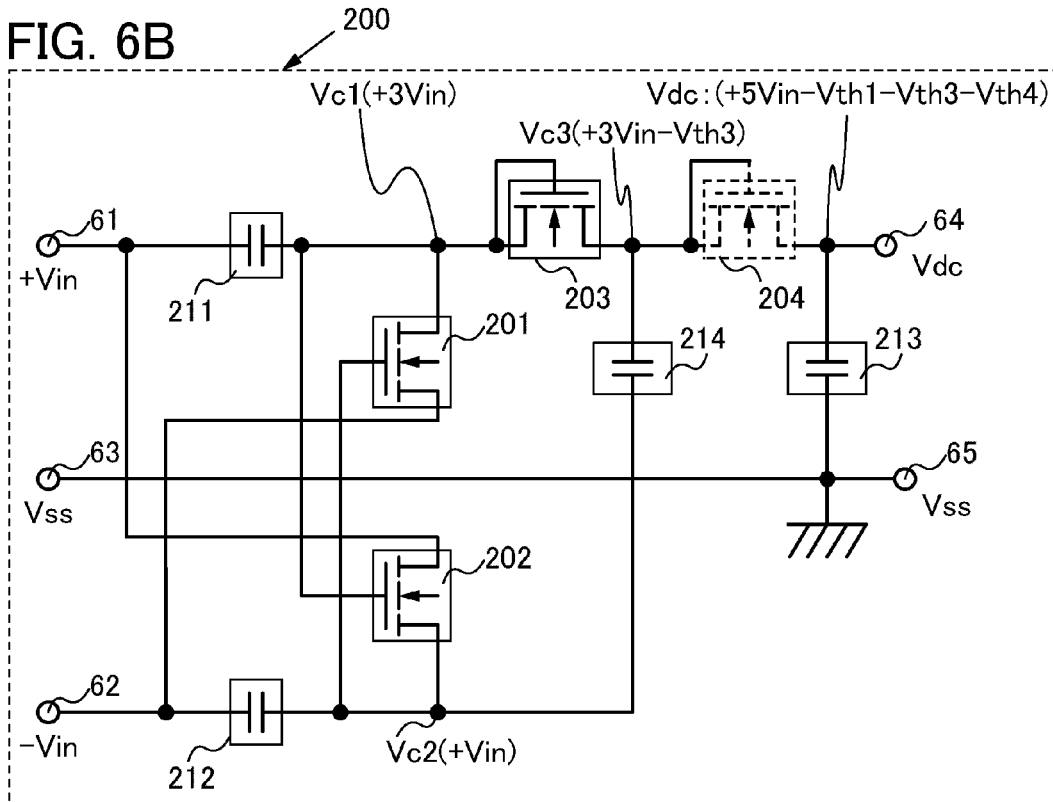

RECTIFIER CIRCUIT AND SEMICONDUCTOR DEVICE USING THE SAME

BACKGROUND OF THE INVENTION

1. Field of the Invention

The present invention relates to a rectifier circuit, and in particular relates to a rectifier circuit using a transistor and a semiconductor device using the rectifier circuit.

2. Description of the Related Art

A contactless power feeding technique by which power is contactlessly supplied to a power supply circuit of an electronic device is known. In comparison with a conventional power feeding technique using a contact, the contactless power feeding technique is convenient because the positional relation between the electronic device and a power feeding device is not severely limited during power feeding. Specifically, a method for transmitting power from a contactless power feeding device with a radio wave, magnetic force, or the like by utilizing electromagnetic induction, a radio wave, or resonance of an electric field or a magnetic field is known.

Neither a primary battery nor replacement of a primary battery is necessary for an electronic device which is operated only by power fed according to the contactless power feeding technique; therefore, the electronic device is convenient. In addition, the electronic device in which not only the primary battery but also a secondary battery or the like are not used is referred to as a passive electronic device, realizing reduction in weight, size, and manufacturing cost. An example of such an electronic device is a passive radio frequency identification (RFID) tag.

Note that the amount of power fed by the contactless power feeding technique varies depending on the distance between a contactless power feeding device and an electronic device supplied with power. In the case of a short distance between the contactless power feeding device and the electronic device, a large amount of power can be supplied to the electronic device, whereas in the case of a long distance between the devices, even power with which the electronic device can operate cannot be supplied.

A device in which an electronic device is provided with a voltage doubler rectifier circuit and a device in which a MOS field effect transistor is applied to a rectifier element of a voltage doubler rectifier circuit are devised so that the electronic device can operate even the power supplied from the contactless power feeding device is small (Patent Document 1).

REFERENCE

[Patent Document 1] Japanese Published Patent Application No. 2002-176141

SUMMARY OF THE INVENTION

In the case where an electronic circuit connected to a rectifier circuit includes a transistor, when a rectifier element of the rectifier circuit is also formed using a transistor, the transistor of the electronic circuit and the transistor of the rectifier circuit can be formed in the same process; therefore, a manufacturing process is simplified. On the other hand, when a rectifier element is formed using a transistor, there arises a problem in that output voltage is decreased by the threshold voltage of the transistor.

Further, a rectifier circuit outputs DC voltage which is substantially proportional to the amplitude of input AC voltage. Therefore, in the case where the input AC voltage is minute, a method in which a voltage doubler circuit is connected to the rectifier circuit in order to increase the DC voltage to be output is known. However, in the case where the amplitude of input AC voltage varies greatly, a malfunction may occur in some cases due to connection of the voltage doubler circuit to the rectifier circuit. Specifically, when the amplitude of input AC voltage is increased, a malfunction such that excessive voltage is output to a circuit of a subsequent stage and the circuit of a subsequent stage is damaged may occur in some cases.

The present invention is made in view of the foregoing technical background. Therefore, an object is to provide a rectifier circuit of which the drop in the output voltage by the threshold voltage of a transistor used as a rectifier element is suppressed.

Another object is to provide a rectifier circuit whose variations in the output voltage are suppressed even in the case where the amplitude of input AC voltage greatly varies.

Another object is to provide a semiconductor device which can operate even when power supplied from a contactless power feeding device is minute.

Another object is to provide a semiconductor device which stably operates even in the case where the amplitude of AC voltage supplied from a contactless power feeding device varies greatly.

In order to achieve the objects, the present invention focuses on a connection position of a gate electrode of a transistor included in a rectifier element, and the structure of a rectifier circuit is considered.

An example of a rectifier circuit using a transistor as a rectifier element is illustrated in FIG. 1A, and the operation is described with reference to FIG. 1B, FIGS. 2A and 2B and FIGS. 3A and 3B.

A rectifier circuit 100 illustrated in FIG. 1A includes a first transistor 101, a second transistor 102, a third transistor 103, a fourth transistor 104, a first capacitor 111, a second capacitor 112, a third capacitor 113, and a fourth capacitor 114. The first transistor 101, the second transistor 102, the third transistor 103, and the fourth transistor 104 are n-channel enhancement transistors. Further, the rectifier circuit 100 includes a first terminal 51, a second terminal 52, a third terminal 53, a fourth terminal 54, and a fifth terminal 55.

A first electrode of the first capacitor 111 and a gate electrode and a second electrode of the second transistor 102 are connected to the first terminal 51. The third terminal 53 is grounded together with the fifth terminal 55. A first electrode of the second capacitor 112 and a gate electrode and a second electrode of the first transistor 101 are connected to the second terminal 52. A second electrode of the first capacitor 111, a first electrode of the first transistor 101, and a gate electrode and a second electrode of the third transistor 103 are connected to form a node n1. A second electrode of the second capacitor 112, a first electrode of the second transistor 102, and a first electrode of the fourth capacitor 114 are connected to form a node n2. In addition, a first electrode of the third transistor 103, a second electrode of the fourth capacitor 114, and a gate electrode and a second electrode of the fourth transistor 104 are connected to form a node n3. The fourth terminal 54 and a first electrode of the third capacitor 113 are connected to a first electrode of the fourth transistor 104. Further, a second electrode of the third capacitor 113 is grounded.

Operation when the AC voltage is applied to the first terminal 51 and the second terminal 52 of the rectifier circuit 100 is described. Note that the threshold voltage of the first transistor 101 is Vth1, the threshold voltage of the second transistor 102 is Vth2, the threshold voltage of the third transistor 103 is Vth3, and the threshold voltage of the fourth transistor 104 is Vth4.

Operation of the rectifier circuit illustrated in FIG. 1A is described in accordance with a phase of AC voltage applied to the first terminal 51 and the second terminal 52. Specifically, as illustrated in FIG. 1B, the following four periods are described separately: a first period T1, a second period T2, a third period T3, and a fourth period T4. Note that after the fourth period T4 in the rectifier circuit, the operation in the third period T3 and the operation in the fourth period T4 are alternately repeated. In addition, an example of the operation of the rectifier circuit is described below. For example, a period (a rising period) in which the operation in the first period T1 and the operation in the second period T2 are alternately repeated may exist in some cases depending on a frequency and the capability of the transistor. Further, the length of the rising period may vary in some cases. After the voltages of the node n1, the node n2, the node n3, and the fourth terminal 54 completely rise, the operation in the third period T3 and the operation in the fourth period T4 are alternately repeated. Note that, the potential output from the rectifier circuit depends on the amplitude of potential input to the first terminal or the second terminal and the characteristics of the transistors. Therefore, the description is made below in the states where the potential of the first terminal or the second terminal in each period is set to be the maximum value or the minimum value as examples. The state of the rectifier circuit when the potential of the first terminal or the second terminal is increasing or decreasing is between the states when the potentials are the maximum value and the minimum value immediately before and after the period.

<First Period T1>

First, the operation in the first period T1 in which voltage having 0V to a maximum value of +Vin is applied to the second terminal 52 and voltage having 0V to a minimum value of −Vin is applied to the first terminal 51 is described (see FIG. 2A).

When the potential (+Vin, for example) of the gate electrode of the first transistor 101 connected to the second terminal 52 becomes higher than the potential of the first electrode of the first transistor 101 connected to the node n1 and a difference between the potentials exceeds the threshold voltage Vth1, current flows from the second electrode of the first transistor 101 to the first electrode thereof, so that the potential Vc1 of the node n1 increases to the value of (+Vin−Vth1).

The potential (−Vin, for example) of the gate electrode of the second transistor 102 connected to the first terminal 51 is lower than the potential (+Vin) of the first electrode of the second transistor 102 connected to the node n2; therefore, the second transistor 102 becomes off.

The potential Vc1 (+Vin−Vth1, for example) of the gate electrode of the third transistor 103 connected to the node n1 becomes lower than the potential (+Vin) of the first electrode of the third transistor 103 connected to the node n3; therefore, the third transistor 103 is off.

When the potential Vc3 (+Vin, for example) of the gate electrode of the fourth transistor 104 connected to the node n3 becomes higher than the potential of the first electrode of the fourth transistor 104 connected to the fourth terminal 54 and a difference between the potentials exceeds the threshold voltage Vth4, current flows from the second electrode of the fourth transistor 104 to the first electrode thereof, so that the potential Vdc of the fourth terminal 54 increases to the value of (+Vin−Vth4).

<Second Period T2>

Next, the operation in the second period T2 in which voltage changing from 0 to a minimum value of −Vin is applied to the second terminal 52 and voltage changing from 0 to a maximum value of +Vin is applied to the first terminal 51, is described (see FIG. 2B).

The potential (−Vin, for example) of the gate electrode of the first transistor 101 connected to the second terminal 52 becomes lower than the potential of the first electrode of the first transistor 101 connected to the node n1; therefore, the first transistor 101 is off.

When the potential (+Vin, for example) of the gate electrode of the second transistor 102 connected to the first terminal 51 becomes higher than the potential of the first electrode of the second transistor 102 connected to the node n2 and a difference between the potentials exceeds the threshold voltage Vth2, current flows from the second electrode of the second transistor 102 to the first electrode thereof, so that the potential Vc2 of the node n2 increases to the value of (+Vin−Vth2).

When the potential (+3Vin−Vth1, for example) of the gate electrode of the third transistor 103 connected to the node n1 becomes higher than the potential of the first electrode of the third transistor 103 connected to the node n3 and a difference between the potentials exceeds the threshold voltage Vth3, current flows from the second electrode of the third transistor 103 to the first electrode thereof, so that the potential Vc3 of the node n3 increases to the value of (+3Vin−Vth1−Vth3).

The potential Vc3 (+3Vin−Vth1−Vth3, for example) of the gate electrode of the fourth transistor 104 connected to the node n3 becomes higher than the potential of the first electrode of the fourth transistor 104 connected to the fourth terminal 54 and a difference between the potentials exceeds the threshold voltage Vth4, current flows from the second electrode of the fourth transistor 104 to the first electrode thereof, so that the potential Vc4 of the fourth terminal 54 increases to the value of (+3Vin−Vth1−Vth3−Vth4).

<Third Period T3>

Next, the operation in the third period T3 in which the phase of AC potential is reversed and voltage changing from 0 to a maximum value of +Vin is applied to the second terminal 52 again and voltage changing from 0 to a minimum value of −Vin is applied to the first terminal 51, is described (see FIG. 3A).

When the potential (+Vin, for example) of the gate electrode of the first transistor 101 connected to the second terminal 52 becomes higher than the potential of the first electrode of the first transistor 101 connected to the node n1 and a difference between the potentials exceeds the threshold voltage Vth1, current flows from the second electrode of the first transistor 101 to the first electrode thereof, so that the potential Vc1 of the node n1 maintains more than or equal to (+Vin−Vth1).

The potential (−Vin, for example) of the gate electrode of the second transistor 102 connected to the first terminal 51 becomes lower than the potential of the first electrode of the second transistor 102 connected to the node n2; therefore, the second transistor 102 becomes off.

The potential Vc1 (+Vin−Vth1, for example) of the gate electrode of the third transistor 103 connected to the node n1 becomes lower than the potential (+5Vin−Vth1−Vth3) of the first electrode of the third transistor 103 connected to the node n3; therefore, the third transistor 103 becomes off.

When the potential Vc3 (+5Vin−Vth1−Vth3, for example) of the gate electrode of the fourth transistor 104 connected to the node n3 becomes higher than the potential of the first electrode of the fourth transistor 104 connected to the fourth terminal 54 and a difference between the potentials exceeds the threshold voltage Vth4, current flows from the second electrode of the fourth transistor 104 to the first electrode thereof, so that the potential Vdc of the fourth terminal 54 increases to the value of (+5Vin−Vth1−Vth3−Vth4).

<Fourth Period T4>

Next, the operation in the fourth period T4 in which the phase of AC potential is reversed: voltage changing from 0 to a minimum value of −Vin is applied to the second terminal 52 and voltage changing from 0 to a maximum value of +Vin is applied to the first terminal 51, is described (see FIG. 3B).

The potential (−Vin, for example) of the gate electrode of the first transistor 101 connected to the second terminal 52 becomes lower than the potential of the first electrode of the first transistor 101 connected to the node n1; therefore, the first transistor 101 becomes off.

When the potential (+Vin, for example) of the gate electrode of the second transistor 102 connected to the first terminal 51 becomes higher than the potential of the first electrode of the second transistor 102 connected to the node n2 and a difference between the potentials exceeds the threshold voltage Vth2, current flows from the second electrode of the second transistor 102 to the first electrode thereof, so that the potential Vc2 of the node n2 maintains more than or equal to (+Vin−Vth2).

When the potential (+3Vin−Vth1, for example) of the gate electrode of the third transistor 103 connected to the node n1 becomes higher than the potential of the first electrode of the third transistor 103 connected to the node n3 and a difference between the potentials exceeds the threshold voltage Vth3, current flows from the second electrode of the third transistor 103 to the first electrode thereof, so that the potential Vc3 of the node n3 maintains more than or equal to (+3Vin−Vth1−Vth3).

The potential Vc3 (+3Vin−Vth1−Vth3, for example) of the gate electrode of the fourth transistor 104 connected to the node n3 becomes lower than the potential Vdc (+5Vin−Vth1−Vth3−Vth4) of the fourth terminal 54 connected to the first electrode of the fourth transistor 104; therefore, the fourth transistor 104 becomes off.

Note that the third capacitor 113 is used for smoothing the potential Vdc of the fourth terminal 54. A capacitor having a high capacitance value is used so as not to cause a voltage drop due to current consumption of a circuit of a subsequent stage when the fourth transistor 104 is off.

In the above-described rectifier circuit, the rectifier element is formed with a structure in which the gate electrode and the second electrode of the transistor are connected to each other at the same potential. The rectifier circuit rectifies the AC voltage applied to the first terminal 51 and the second terminal 52 and outputs the DC voltage with the potential Vdc (+5Vin−Vth1−Vth3−Vth4).

Note that the potential Vdc (+5Vin−Vth1−Vth3−Vth4) output by the rectifier circuit is decreased by the threshold voltages (Vth1, Vth3, and Vth4) of the transistors.

The phenomenon in which the output potential Vdc of the rectifier circuit is decreased by the threshold voltages of the transistors is not considered as a problem in the case where the input voltage Vin is sufficiently high. However, the phenomenon becomes a problem in the case where the input voltage Vin is as low as the sum of the threshold voltages of the transistors because output from the rectifier circuit is not obtained. For example, the phenomenon becomes a problem in the case where an electronic device including a rectifier circuit receives the supply of power at a position which is far away from a contactless power feeding device.

The drop in the output voltage by the threshold voltage generated in the case where the transistor is used as the rectifier element is attributed to a structure in which the gate electrode and the second electrode of the n-channel enhancement transistor are connected to each other at the same potential.

The structure conceived in view of the above problems is such that a transistor is used as a rectifier element, in which a gate electrode of the transistor is connected to a second electrode of the transistor through a capacitor, and the potential of the gate electrode is held to be higher than the potential of the second electrode by a difference greater than or equal to the threshold voltage.

With this structure, the potential of the gate electrode of the transistor is higher than that of the second electrode; therefore, current flows from the second electrode to the first electrode until the potentials of the second electrode and the first electrode become equal to each other, so that the drop in the output voltage by the threshold voltage of the transistor can be prevented.

In other words, one embodiment of the present invention is a rectifier circuit which includes a first transistor whose gate electrode is connected to a node 2, whose first electrode is connected to a node 1, and whose second electrode is connected to a second terminal; a second transistor whose gate electrode is connected to the node 1, whose first electrode is connected to the node 2, and whose second electrode is connected to a first terminal; a third transistor whose gate electrode is connected to the node 1, whose first electrode is connected to a node 3, and whose second electrode is connected to the node 1; a first capacitor whose first electrode is connected to the first terminal and whose second electrode is connected to the node 1; and a second capacitor whose first electrode is connected to the second terminal and whose second electrode is connected to the node 2. The first transistor, the second transistor, and the third transistor are n-channel enhancement transistors, and AC voltage input to the first terminal and the second terminal is rectified to DC voltage and output to the node 3.

One embodiment of the present invention is a rectifier circuit which includes a first transistor whose gate electrode is connected to a node 2, whose first electrode is connected to a node 1, and whose second electrode is connected to a second terminal; a second transistor whose gate electrode is connected to the node 1, whose first electrode is connected to the node 2, and whose second electrode is connected to a first terminal; a third transistor whose gate electrode is connected to the node 1, whose first electrode is connected to a node 3, and whose second electrode is connected to the node 1; a fourth transistor whose gate electrode is connected to the node 3, whose first electrode is connected to a fourth terminal, and whose second electrode is connected to the node 3; a first capacitor whose first electrode is connected to the first terminal and whose second electrode is connected to the node 1; a second capacitor whose first electrode is connected to the second terminal and whose second electrode is connected to the node 2; a fourth capacitor whose first electrode is connected to the node 2 and whose second electrode is connected to the node 3; and a third capacitor whose first electrode is connected to the fourth terminal and whose second electrode is grounded. The first transistor, the second transistor, the third transistor, and the fourth transistor are n-channel enhancement transistors.

According to the above embodiment of the present invention, each of the first transistor and the second transistor is used as a rectifier element, in which the gate electrode of the transistor is connected to the second electrode of the transistor through the capacitor, and the potential of the gate electrode is held to be higher than the potential of the second electrode by a difference greater than or equal to the threshold voltage. Thus, a rectifier circuit of which the drop in the output voltage by the threshold voltage of the first transistor used as a rectifier element is suppressed can be provided. Further, a rectifier circuit which can efficiently convert AC power into the DC power even when power supplied by a contactless power feeding device is minute can be provided.

One embodiment of the present invention is the rectifier circuit in which each of the first transistor, the second transistor, and the third transistor includes a gate electrode in contact with one surface of a gate insulating layer; an oxide semiconductor layer that is in contact with the other surface of the gate insulating layer and is overlapped with the gate electrode; a source electrode and a drain electrode, which are in contact with the oxide semiconductor layer and include end portions which overlap with the gate electrode; and an oxide insulating layer that is in contact with the oxide semiconductor layer and is overlapped with a channel formation region.

According to the above embodiment of the present invention, off-state current of the transistor used as a rectifier element is reduced. Accordingly, a loss by current flowing through the transistor in an off state in the rectifier circuit can be reduced.

One embodiment of the present invention is the rectifier circuit in which a first limiting circuit is provided between the first terminal and the node 1 and a second limiting circuit is provided between the second terminal and the node 2.

According to the above embodiment of the present invention, the upper limit of each potential of the node 1 and the node 2 can be set. Thus, a rectifier circuit whose variations in the output voltage are suppressed even in the case where the amplitude of input AC voltage greatly varies can be provided.

One embodiment of the present invention is a rectifier circuit which includes a first transistor whose gate electrode is connected to a node 2, whose first electrode is connected to a node 1, and whose second electrode is connected to a second terminal; a second transistor whose gate electrode is connected to the node 1, whose first electrode is connected to the node 2, and whose second electrode is connected to a first terminal; a third transistor whose gate electrode is connected to the node 1, whose first electrode is connected to a node 3, and whose second electrode is connected to the node 1; a fourth transistor whose gate electrode is connected to the node 3, whose first electrode is connected to a fourth terminal, and whose second electrode is connected to the node 3; a fifth transistor whose gate electrode is connected to the node 3, whose first electrode is connected to the node 2, and whose second electrode is connected to the fourth terminal; a first capacitor whose first electrode is connected to the first terminal and whose second electrode is connected to the node 1; a second capacitor whose first electrode is connected to the second terminal and whose second electrode is connected to the node 2; a fourth capacitor whose first electrode is connected to the node 2 and whose second electrode is connected to the node 3; and a third capacitor whose first electrode is connected to the fourth terminal and whose second electrode is grounded. The first transistor, the second transistor, the third transistor, the fourth transistor, and the fifth transistor are n-channel enhancement transistors, and the AC voltage input to the first terminal and the second terminal is rectified to the DC voltage and output to the fourth terminal.

According to the above embodiment of the present invention, the upper limit of the potential of the fourth terminal can be set. Thus, a rectifier circuit whose variations in the output voltage are suppressed even in the case where the amplitude of input AC voltage greatly varies can be provided.

Further, one embodiment of the present invention is an RFID tag including the above-described rectifier circuit.

According to the above embodiment of the present invention, an RFID tag which can operate even when power supplied by a reader is minute can be provided. Further, an RFID tag which stably operates even when the amplitude of AC voltage supplied from the reader greatly varies can be provided.

According to one embodiment of the present invention, a rectifier circuit of which the drop in the output voltage by the threshold voltage of the transistor used as a rectifier element is suppressed can be provided. A rectifier circuit whose variations in the output voltage are suppressed can be provided. A semiconductor device which can operate even when power supplied by a contactless power feeding device is minute can be provided. A semiconductor device which stably operates even in the case where the amplitude of AC voltage supplied by a contactless power feeding device greatly varies can be provided.

BRIEF DESCRIPTION OF THE DRAWINGS

FIGS. 2A and 2B each illustrate operation of a rectifier circuit using a transistor as a rectifier element.

FIGS. 6A and 6B each illustrate operation of a rectifier circuit according to one embodiment.

DETAILED DESCRIPTION OF THE INVENTION

Figure 1A:
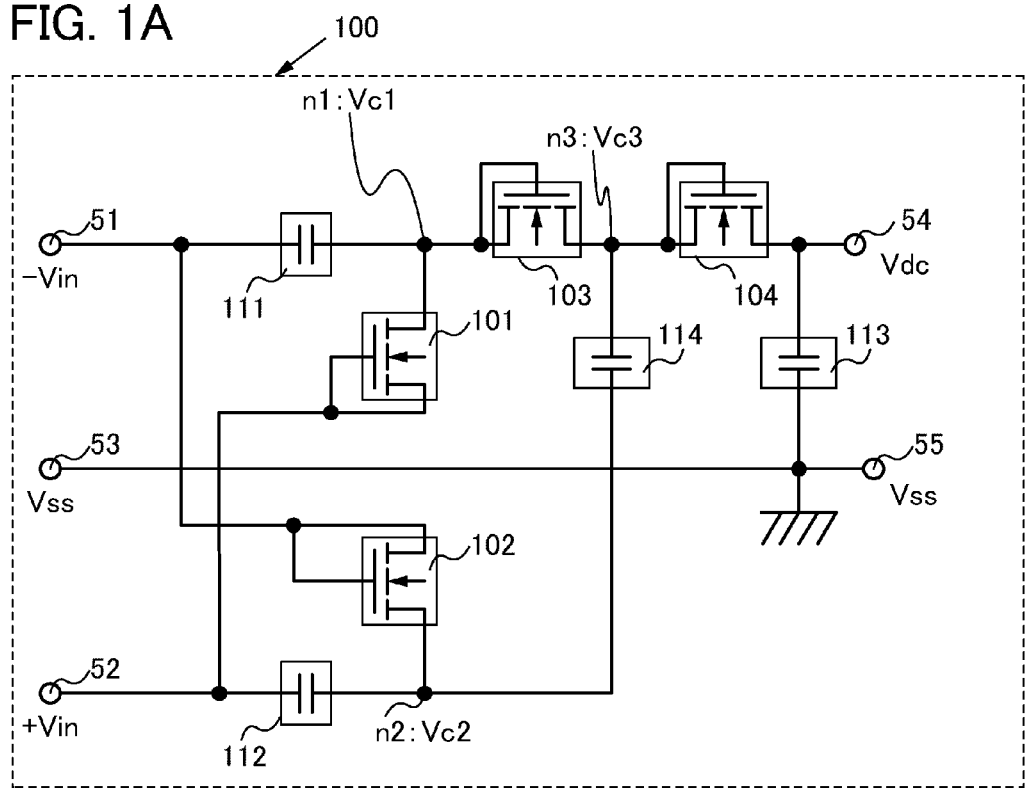
FIGS. 1A and 1B each illustrate a configuration of a rectifier circuit using a transistor as a rectifier element.
Figure 1B:
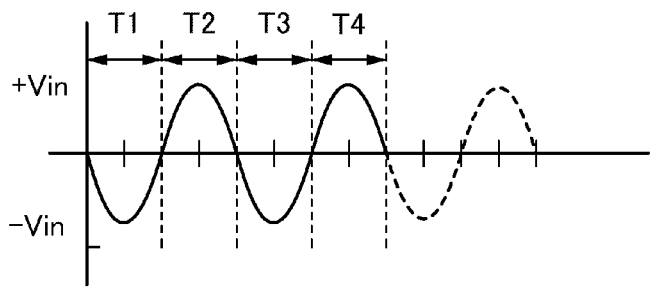
Figure 3A:
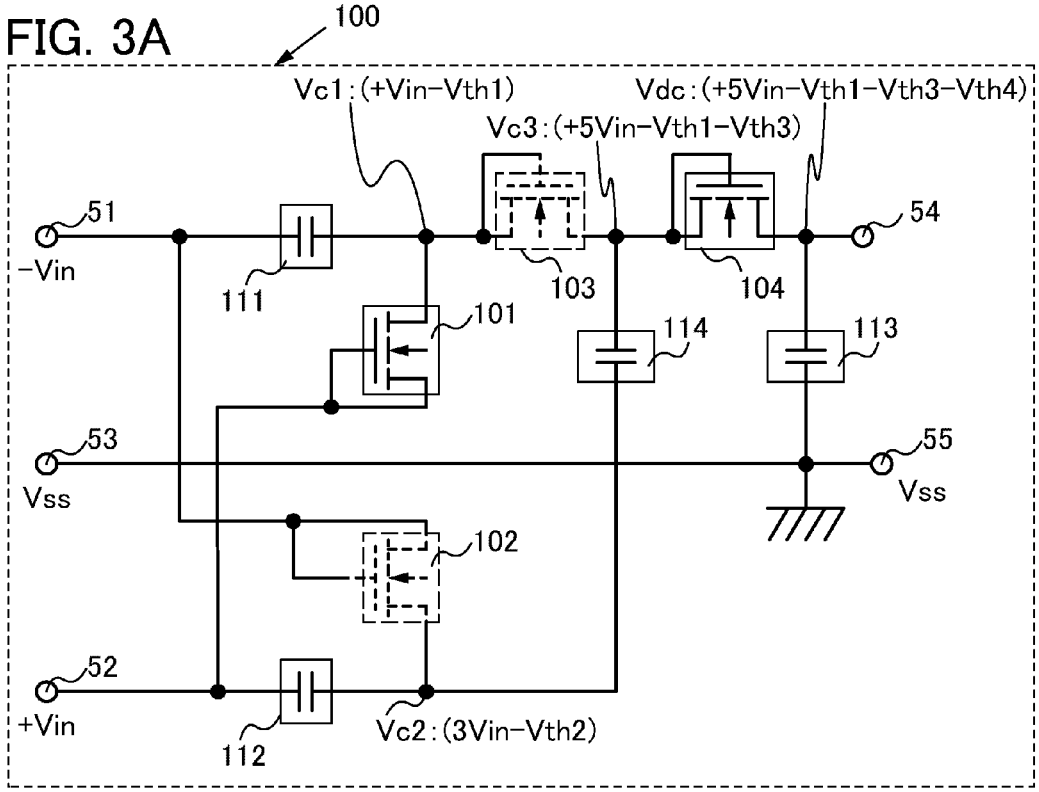
FIGS. 3A and 3B each illustrate operation of a rectifier circuit using a transistor as a rectifier element.
Figure 3B:
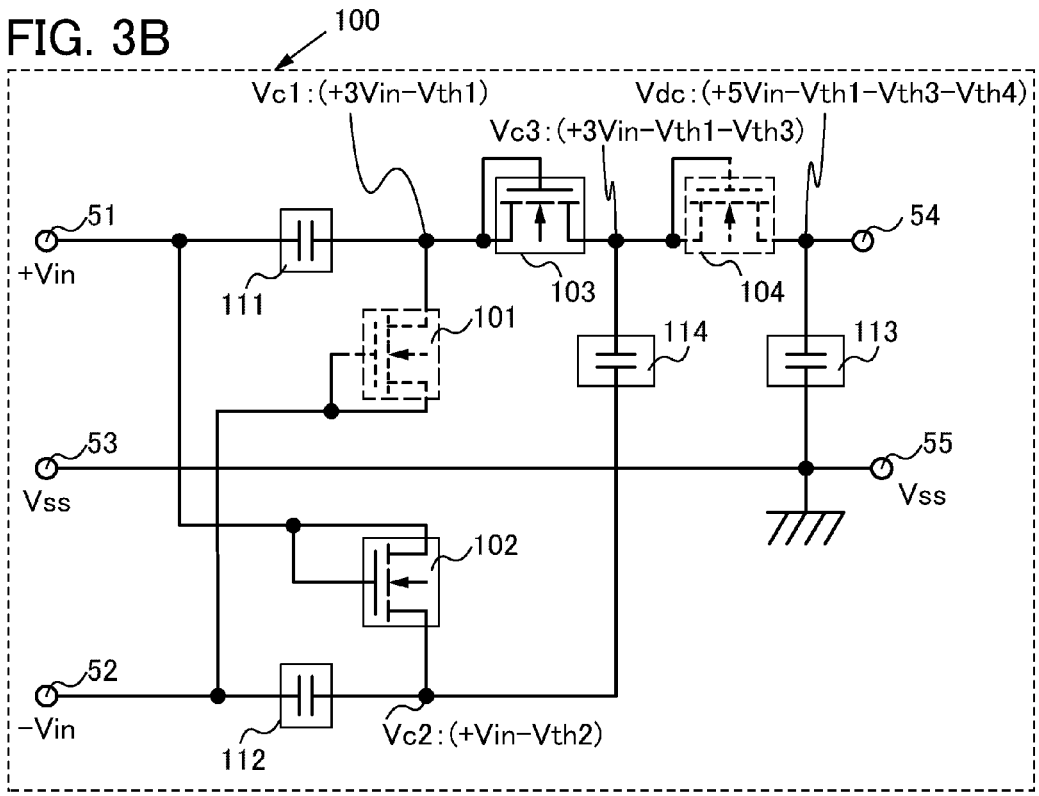

Embodiments will be described in detail with reference to the drawings. Note that the present invention is not limited to the following description, and it will be easily understood by those skilled in the art that various changes and modifications can be made without departing from the spirit and scope of the invention. Therefore, the present invention should not be construed as being limited to the description in the following embodiments. Note that in the structures of the invention described below, the same portions or portions having similar functions are denoted by the same reference numerals in different drawings, and description of such portions is omitted.

Embodiment 1

Figure 4A:
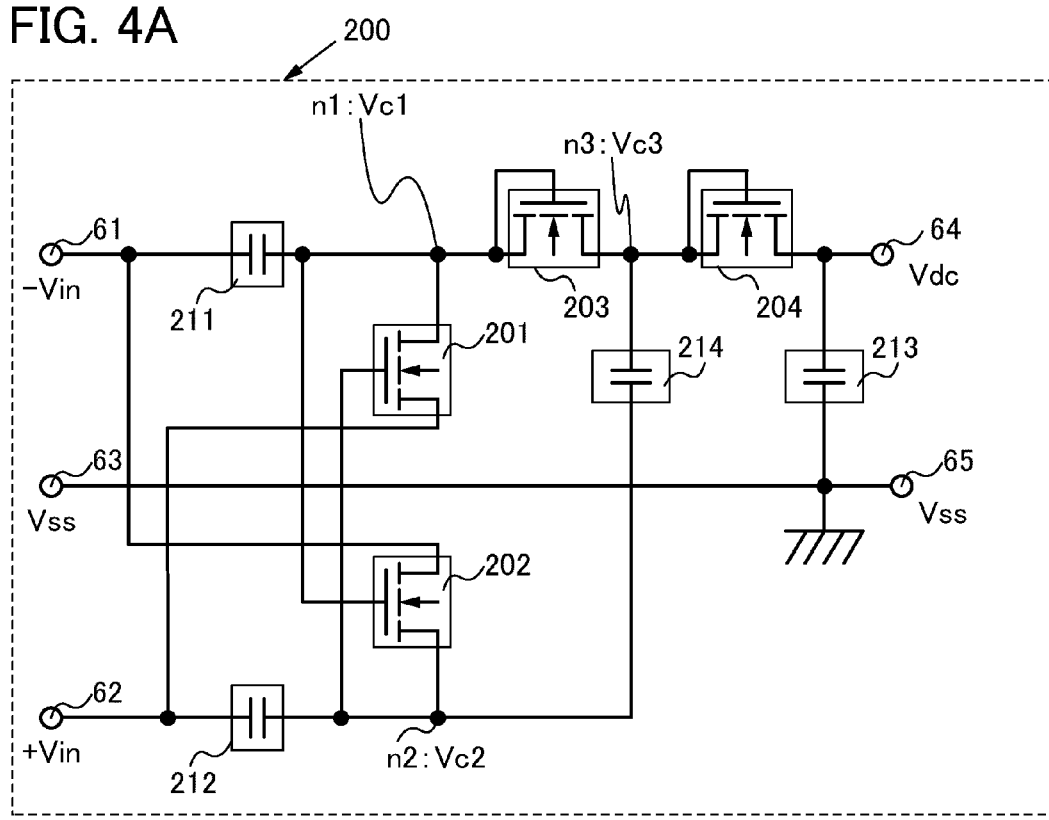
FIGS. 4A and 4B each illustrate a configuration of a rectifier circuit according to one embodiment.

In this embodiment, an example of a rectifier circuit in which a transistor whose gate electrode is connected to a second electrode through a capacitor is used as a rectifier element is illustrated in FIG. 4A and the operation is described with reference to FIG. 4B, FIGS. 5A and 5B and FIGS. 6A and 6B, and FIG. 7.

A rectifier circuit 200 illustrated in FIG. 4A includes a first transistor 201, a second transistor 202, a third transistor 203, a fourth transistor 204, a first capacitor 211, a second capacitor 212, a third capacitor 213, and a fourth capacitor 214. The first transistor 201, the second transistor 202, the third transistor 203, and the fourth transistor 204 are n-channel enhancement transistors. Further, the rectifier circuit 200 includes a first terminal 61, a second terminal 62, a third terminal 63, a fourth terminal 64, and a fifth terminal 65.

A first electrode of the first capacitor 211 and a second electrode of the second transistor 202 are connected to the first terminal 61. The third terminal 63 is grounded together with the fifth terminal 65. A first electrode of the second capacitor 212 and a second electrode of the first transistor 201 are connected to the second terminal 62. A second electrode of the first capacitor 211, a first electrode of the first transistor 201, a gate electrode of the second transistor 202, and a gate electrode and a second electrode of the third transistor 203 are connected to form a node n1. A second electrode of the second capacitor 212, a gate electrode of the first transistor 201, a first electrode of the second transistor 202, and a first electrode of the fourth capacitor 214 are connected to form a node n2. In addition, a first electrode of the third transistor 203, a second electrode of the fourth capacitor 214, and a gate electrode and a second electrode of the fourth transistor 204 are connected to form a node n3. The fourth terminal 64 and a first electrode of the third capacitor 213 are connected to a first electrode of the fourth transistor 204. Further, a second electrode of the third capacitor 213 is grounded.

Operation when the AC voltage is applied to the first terminal 61 and the second terminal 62 of the rectifier circuit 200 is described. Note that the threshold voltage of the first transistor 201 is Vth1, the threshold voltage of the second transistor 202 is Vth2, the threshold voltage of the third transistor 203 is Vth3, and the threshold voltage of the fourth transistor 204 is Vth4.

Figure 4B:
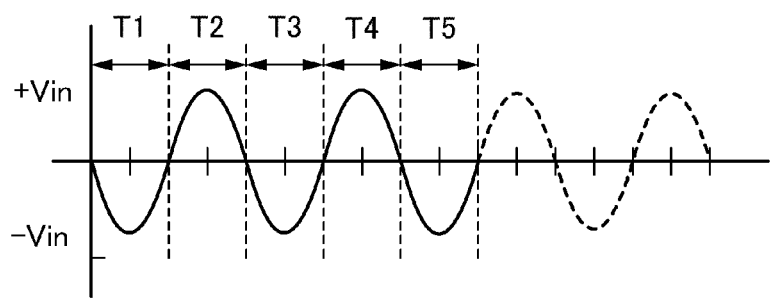

Operation of the rectifier circuit of this embodiment illustrated in FIG. 4A in the first period T1 to the fifth period T5 as illustrated in FIG. 4B is described in accordance with a phase of AC voltage applied to the first terminal 61 and the second terminal 62. Note that after the fifth period T5 in the rectifier circuit of this embodiment, the operation in the fourth period T4 and the operation in the fifth period T5 are alternately repeated. An example of the operation of the rectifier circuit of this embodiment is described below. For example, a period (a rising period) in which the operation in the first period T1, the operation in the second period T2, and the operation in the third period T3 are repeated one after the other may exist in some cases depending on a frequency and the capability of the transistor. In addition, the length of the rising period may vary in some cases. After the voltages of the node n1, the node n2, the node n3, and the fourth terminal 64 completely rise, the operation in the fourth period T4 and the operation in the fifth period T5 are alternately repeated. Note that, the potential output from the rectifier circuit of one embodiment of the invention depends on the amplitude of potential input to the first terminal or the second terminal and the characteristics of the transistors. Therefore, the description is made below in the states where the potential of the first terminal or the second terminal in each period is set to be the maximum value or the minimum value as examples. The state of the rectifier circuit when the potential of the first terminal or the second terminal is increasing or decreasing is between the states when the potentials being the maximum value and the minimum value immediately before and after the period.

<First Period T1>

Figure 5A:
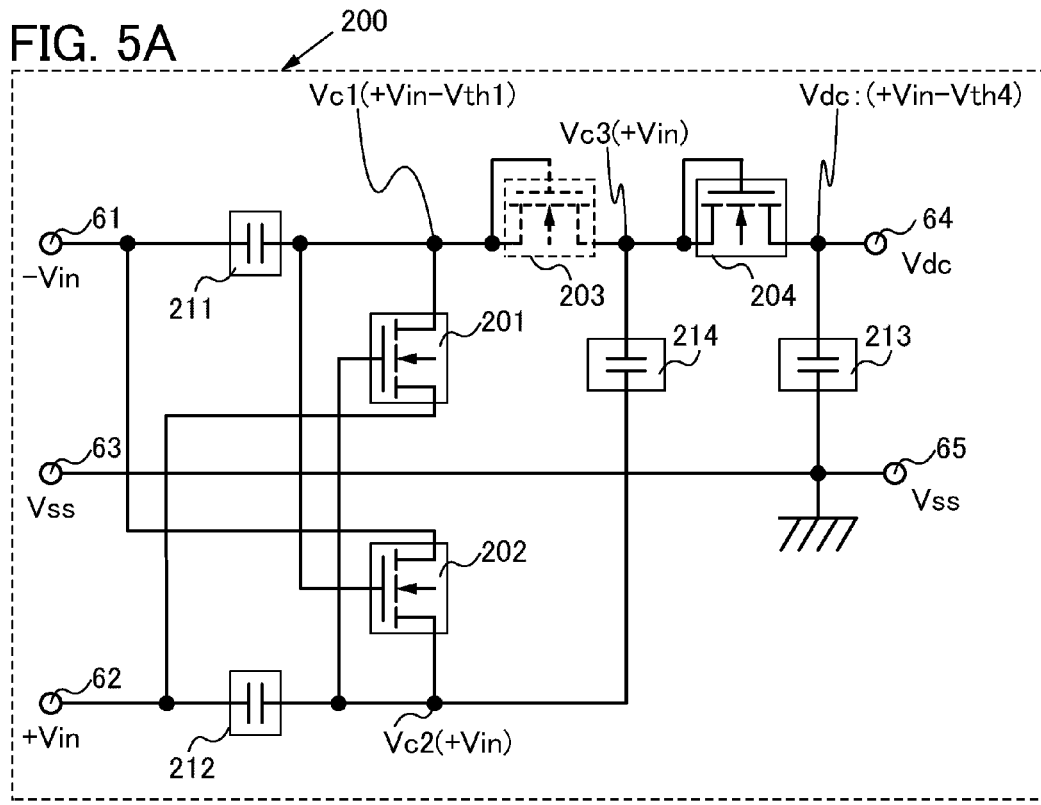
FIGS. 5A and 5B each illustrate operation of a rectifier circuit according to one embodiment.

First, the operation in the first period T1 in which voltage changing from 0 to a maximum value of +Vin is applied to the second terminal 62 and voltage changing from 0 to a minimum value of −Vin is applied to the first terminal 61 is described (see FIG. 5A).

When the potential (+Vin) of the gate electrode of the first transistor 201 connected to the node n2 becomes higher than the potential of the first electrode of the first transistor 201 connected to the node n1 and a difference between the potentials exceeds the threshold voltage Vth1, current flows from the second electrode of the first transistor 201 to the first electrode thereof, so that the potential Vc1 of the node n1 increases to the value of (+Vin−Vth1).

In a step where the potential Vc1 of the node n1 increases to the value of (+Vin−Vth1) by the first transistor 201, when the potential of the gate electrode of the second transistor 202 connected to the node n1 becomes higher than the potential (−Vin) of the second electrode of the second transistor 202 connected to the first terminal 61 and a difference between the potentials exceeds the threshold voltage Vth2, current flows from the first electrode of the second transistor 202 to the second electrode thereof. The current flowing from the first electrode of the second transistor 202 to the second electrode thereof suppresses so that the potential Vc2 of the node n2 does not become too high.

The potential Vc1 (+Vin−Vth1) of the gate electrode of the third transistor 203 connected to the node n1 becomes lower than the potential (+Vin) of the first electrode of the third transistor 203 connected to the node n3; therefore, the third transistor 203 becomes off.

When the potential Vc3 (+Vin) of the gate electrode of the fourth transistor 204 connected to the node n3 becomes higher than the potential of the first electrode of the fourth transistor 204 connected to the fourth terminal 64 and a difference between the potentials exceeds the threshold voltage Vth4, current flows from the second electrode of the fourth transistor 204 to the first electrode thereof, so that the potential Vdc of the fourth terminal 64 increases to the value of (+Vin−Vth4).

<Second Period T2>

Figure 5B:
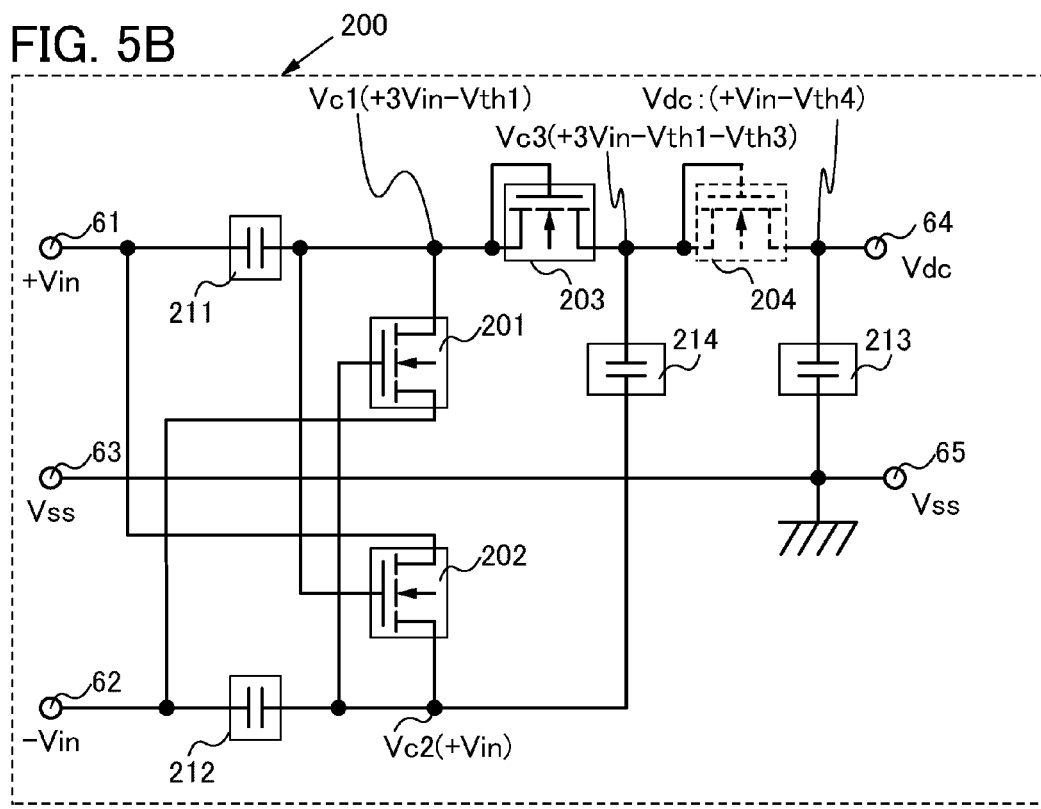

Next, the operation in the second period T2 in which the phase of AC potential is reversed: negative voltage changing from 0 to a minimum value of −Vin is applied to the second terminal 62 and voltage changing from 0 to a maximum value of +Vin is applied to the first terminal 61, is described (see FIG. 5B).

In a step where the potential Vc2 of the node n2 increases to the value of +Vin by the second transistor 202 to be described later, when the potential of the gate electrode of the first transistor 201 connected to the node n2 becomes higher than the potential (−Vin) of the second electrode of the first transistor 201 connected to the second terminal 62 and a difference between the potentials exceeds the threshold voltage Vth1, current flows from the first electrode of the first transistor 201 to the second electrode thereof. The current flowing from the first electrode of the first transistor 201 to the second electrode thereof suppresses so that the potential Vc1 of the node n1 does not become too high.

When the potential (+3Vin−Vth1) of the gate electrode of the second transistor 202 connected to the node n1 becomes higher than the potential of the first electrode of the second transistor 202 connected to the node n2 and a difference between the potentials exceeds the threshold voltage Vth2, current flows from the second electrode of the second transistor 202 to the first electrode thereof.

Consequently, in the case where the sum of the threshold voltage Vth1 and the threshold voltage Vth2 is smaller than Vin, the potential Vc2 of the node n2 increases to Vin. In other words, the potential Vc2 of the node n2 connected to the first electrode of the second transistor 202 and the potential of the first terminal 61 connected to the second electrode of the second transistor 202 are each +Vin, and no potential difference is seen. In this manner, the voltage drop due to the threshold voltage Vth2 of the second transistor 202 is suppressed.

When the potential (+3Vin−Vth1) of the gate electrode of the third transistor 203 connected to the node n1 becomes higher than the potential (−Vin) of the first electrode of the third transistor 203 connected to the node n3 and a difference between the potentials exceeds the threshold voltage Vth3, current flows from the second electrode of the third transistor 203 to the first electrode thereof, so that the potential Vc3 of the node n3 increases to the value of (+3Vin−Vth1−Vth3).

The potential Vc3 (−Vin) of the gate electrode of the fourth transistor 204 connected to the node n3 becomes lower than the potential (+Vin−Vth4) of the first electrode of the fourth transistor 204 connected to the fourth terminal 64; therefore, the fourth transistor 204 becomes off.

<Third Period T3>

Next, the operation in the third period T3 in which the phase of AC potential is reversed: voltage changing from 0 to a maximum value of +Vin is applied to the second terminal 62 again and voltage changing from 0 to a minimum value of −Vin is applied to the first terminal 61, is described (see FIG. 6A).

When the potential (+3Vin) of the gate electrode of the first transistor 201 connected to the node n2 becomes higher than the potential of the first electrode of the first transistor 201 connected to the node n1 and a difference between the potentials exceeds the threshold voltage Vth1, current flows from the second electrode of the first transistor 201 to the first electrode thereof.

Consequently, in the case where the threshold voltage Vth1 is smaller than Vin, the potential Vc1 of the node n1 increases to Vin. In other words, the potential Vc1 of the node n1 connected to the first electrode of the first transistor 201 and the potential of the second terminal 62 connected to the second electrode of the first transistor 201 are each +Vin, and no potential difference is seen. In this manner, the voltage drop due to the threshold voltage Vth1 of the first transistor 201 is suppressed.

In a step where the potential Vc1 of the node n1 increases to the value of +Vin by the first transistor 201, when the potential of the gate electrode of the second transistor 202 connected to the node n1 becomes higher than the potential (−Vin) of the second electrode of the second transistor 202 connected to the first terminal 61 and a difference between the potentials exceeds the threshold voltage Vth2, current flows from the first electrode of the second transistor 202 to the second electrode thereof. The current flowing from the first electrode of the second transistor 202 to the second electrode thereof suppresses so that the potential Vc2 of the node n2 does not become too high.

The potential Vc1 (+Vin) of the gate electrode of the third transistor 203 connected to the node n1 becomes lower than the potential (+5Vin−Vth1−Vth3) of the first electrode of the third transistor 203 connected to the node n3; therefore, the third transistor 203 becomes off.

When the potential Vc3 (+5Vin−Vth1−Vth3) of the gate electrode of the fourth transistor 204 connected to the node n3 becomes higher than the potential (+Vin−Vth4) of the first electrode of the fourth transistor 204 connected to the fourth terminal 64 and a difference between the potentials exceeds the threshold voltage Vth4, current flows from the second electrode of the fourth transistor 204 to the first electrode thereof, so that the potential Vdc of the fourth terminal 64 increases to the value of (+5Vin−Vth1−Vth3−Vth4).

<Fourth Period T4>

Next, the operation in the fourth period T4 in which the phase of AC potential is reversed: voltage changing from 0 to a minimum value of −Vin is applied to the second terminal 62 and voltage changing from 0 to a maximum value of +Vin is applied to the first terminal 61, is described (see FIG. 6B).

In a step where the potential Vc2 of the node n2 increases to the value of +Vin by the second transistor 202 to be described later, when the potential of the gate electrode of the first transistor 201 connected to the node n2 becomes higher than the potential (−Vin) of the second electrode of the first transistor 201 connected to the second terminal 62 and a difference between the potentials exceeds the threshold voltage Vth1, current flows from the first electrode of the first transistor 201 to the second electrode thereof. The current flowing from the first electrode of the first transistor 201 to the second electrode thereof suppresses so that the potential Vc1 of the node n1 does not become too high.

When the potential (+3Vin) of the gate electrode of the second transistor 202 connected to the node n1 becomes higher than the potential of the first electrode of the second transistor 202 connected to the node n2 and a difference between the potentials exceeds the threshold voltage Vth2, current flows from the second electrode of the second transistor 202 to the first electrode thereof.

Consequently, in the case where the threshold voltage Vth2 is smaller than Vin, the potential Vc2 of the node n2 increases to Vin. In other words, the potential Vc2 of the node n2 connected to the first electrode of the second transistor 202 and the potential of the first terminal 61 connected to the second electrode of the second transistor 202 are each +Vin, and no potential difference is seen. In this manner, the voltage drop due to the threshold voltage Vth2 of the second transistor 202 is suppressed.

When the potential (+3Vin) of the gate electrode of the third transistor 203 connected to the node n1 becomes higher than the potential (+3Vin−Vth1−Vth3) of the first electrode of the third transistor 203 connected to the node n3 and a difference between the potentials exceeds the threshold voltage Vth3, current flows from the second electrode of the third transistor 203 to the first electrode thereof, so that the potential Vc3 of the node n3 increases to the value of (+3Vin−Vth3).

The potential Vc3 (+3Vin−Vth1−Vth3) of the gate electrode of the fourth transistor 204 connected to the node n3 becomes lower than the potential (+5Vin−Vth1−Vth3−Vth4) of the first electrode of the fourth transistor 204 connected to the fourth terminal 64; therefore, the fourth transistor 204 becomes off.

<Fifth Period T5>

Figure 7:
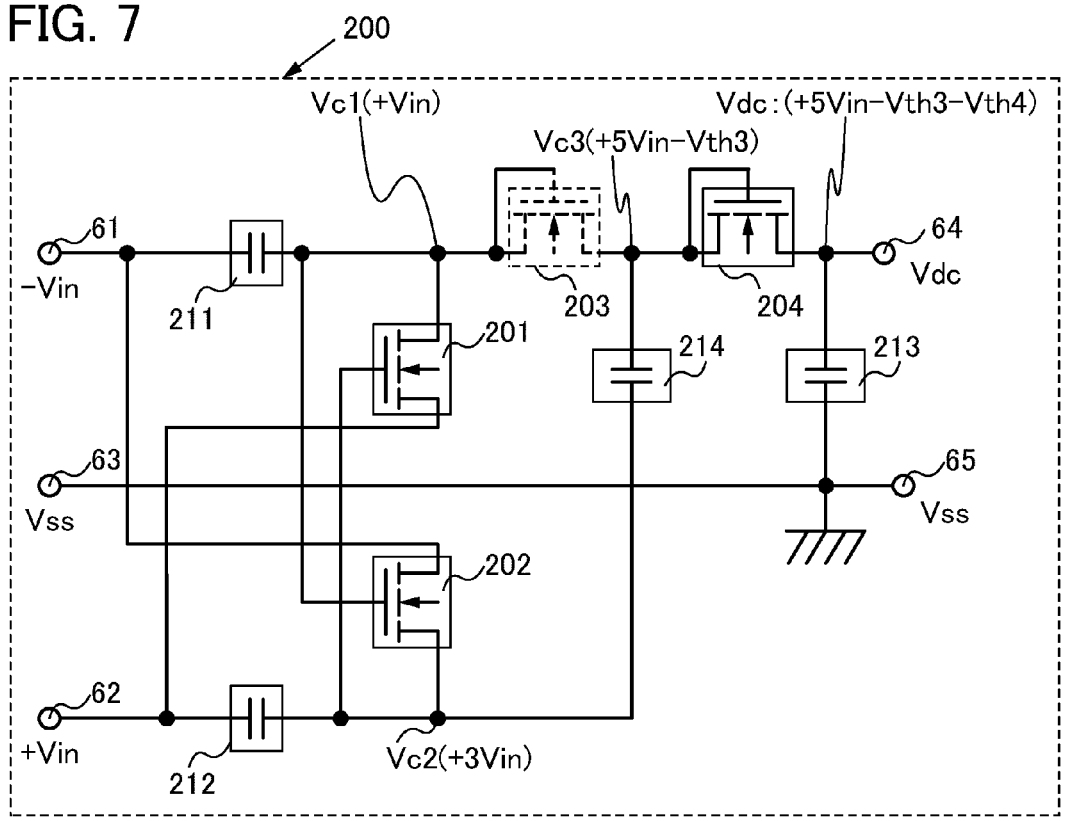
FIG. 7 illustrates operation of a rectifier circuit according to one embodiment.

Next, the operation in the fifth period T5 in which the phase of AC potential is reversed: voltage changing from 0 to a maximum value of +Vin is applied to the second terminal 62 again and voltage changing from 0 to a minimum value of −Vin is applied to the first terminal 61, is described (see FIG. 7).

When the potential (+3Vin) of the gate electrode of the first transistor 201 connected to the node n2 becomes higher than the potential of the first electrode of the first transistor 201 connected to the node n1 and a difference between the potentials exceeds the threshold voltage Vth1, current flows from the second electrode of the first transistor 201 to the first electrode thereof.

Consequently, in the case where the threshold voltage Vth1 is smaller than Vin, the potential Vc1 of the node n1 increases to Vin. In other words, the potential Vc1 of the node n1 connected to the first electrode of the first transistor 201 and the potential of the second terminal 62 connected to the second electrode of the first transistor 201 are each +Vin, and no potential difference is seen. In this manner, the voltage drop due to the threshold voltage Vth1 of the first transistor 201 is suppressed.

In a step where the potential Vc1 of the node n1 increases to the value of +Vin by the first transistor 201, when the potential of the gate electrode of the second transistor 202 connected to the node n1 becomes higher than the potential (−Vin) of the second electrode of the second transistor 202 connected to the first terminal 61 and a difference between the potentials exceeds the threshold voltage Vth2, current flows from the first electrode of the second transistor 202 to the second electrode thereof. The current flowing from the first electrode of the second transistor 202 to the second electrode thereof suppresses so that the potential Vc2 of the node n2 does not become too high.

The potential Vc1 (+Vin) of the gate electrode of the third transistor 203 connected to the node n1 becomes lower than the potential (+5Vin−Vth3) of the first electrode of the third transistor 203 connected to the node n3; therefore, the third transistor 203 becomes off.

When the potential Vc3 (+5Vin−Vth3) of the gate electrode of the fourth transistor 204 connected to the node n3 becomes higher than the potential (+5Vin−Vth1−Vth3−Vth4) of the first electrode of the fourth transistor 204 connected to the fourth terminal 64 and a difference between the potentials exceeds the threshold voltage Vth4, current flows from the second electrode of the fourth transistor 204 to the first electrode thereof, so that the potential Vdc of the fourth terminal 64 increases to the value of (+5Vin−Vth3−Vth4).

Note that the third capacitor 213 is used for smoothing the potential Vdc of the fourth terminal 64. A capacitor having a high capacitance value is used so as not to cause a voltage drop due to current consumption of a circuit of a subsequent stage when the fourth transistor 204 is off.

In the above-described rectifier circuit, the first transistor 201 and the second transistor 202 are used as rectifier elements in such a way that the gate electrode of the first transistor 201 is connected to the second electrode thereof through the second capacitor, and the potential of the gate electrode is held to be higher than the potential of the second electrode by a difference greater than the threshold voltage and the gate electrode of the second transistor 202 is connected to the second electrode thereof through the first capacitor, and the potential of the gate electrode is held to be higher than the potential of the second electrode by a difference greater than the threshold voltage.

Accordingly, the rectifier circuit can output the potential Vdc (+5Vin−Vth3−Vth4) of which a drop by the threshold voltage (Vth1) of the first transistor 201 is suppressed.

Thus, a rectifier circuit of which the drop in the output voltage by the threshold voltage of the first transistor used as a rectifier element is suppressed can be provided. Further, a rectifier circuit whose variations in the output voltage are suppressed can be provided.

Further, a semiconductor device which can operate even when power supplied from a contactless power feeding device is minute can be provided by using the rectifier circuit described in this embodiment. Further, a semiconductor device which stably operates even in the case where the amplitude of AC voltage supplied from a contactless power feeding device varies greatly can be provided.

Figure 14A:
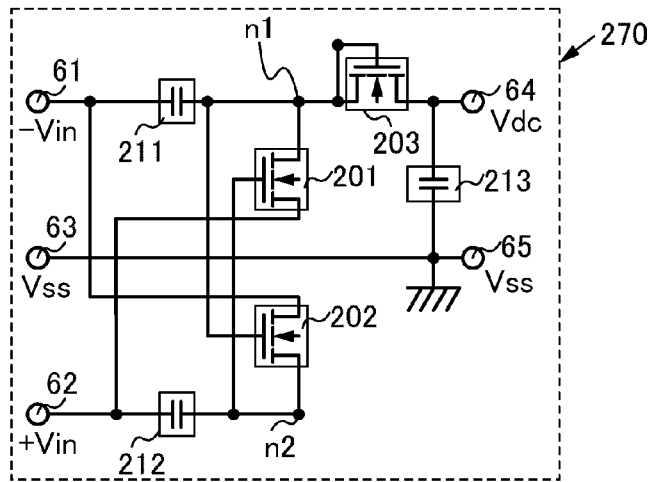
FIGS. 14A to 14C each illustrate a configuration of a rectifier circuit according to one embodiment.

Although the rectifier circuit 200 which is described as an example includes one voltage doubler circuit, a rectifier circuit of one embodiment of the present invention is not limited to this structure. For example, a structure in which the fourth capacitor 214 and the fourth transistor 204 are removed from the rectifier circuit 200 and no voltage doubler circuit is included may be used. A rectifier circuit 270 which does not include a voltage doubler circuit is illustrated in FIG. 14A.

Figure 14B:
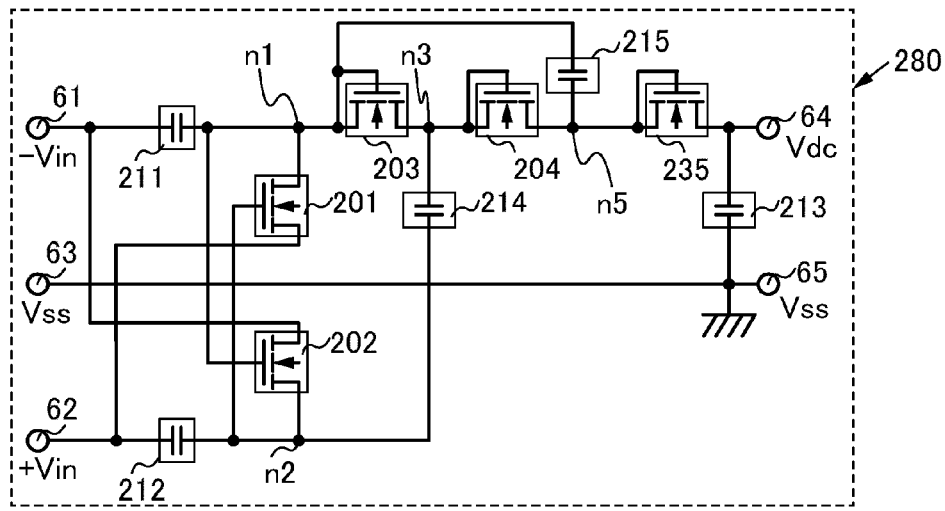

Alternatively, a structure including 1.5 voltage doubler circuits may be used. A rectifier circuit 280 including 1.5 voltage doubler circuits is illustrated in FIG. 14B. In the rectifier circuit 280, a first electrode of a fifth capacitor 215 is connected to the node n1 of the rectifier circuit 200. A second electrode of the fifth capacitor 215, the first electrode of the fourth transistor 204, and a gate electrode and a second electrode of a fifth transistor 235 are connected to form a node n5. The fourth terminal 64 and the first electrode of the third capacitor 213 are connected to a first electrode of the fifth transistor 235. In addition, the second electrode of the third capacitor 213 is grounded.

Figure 14C:
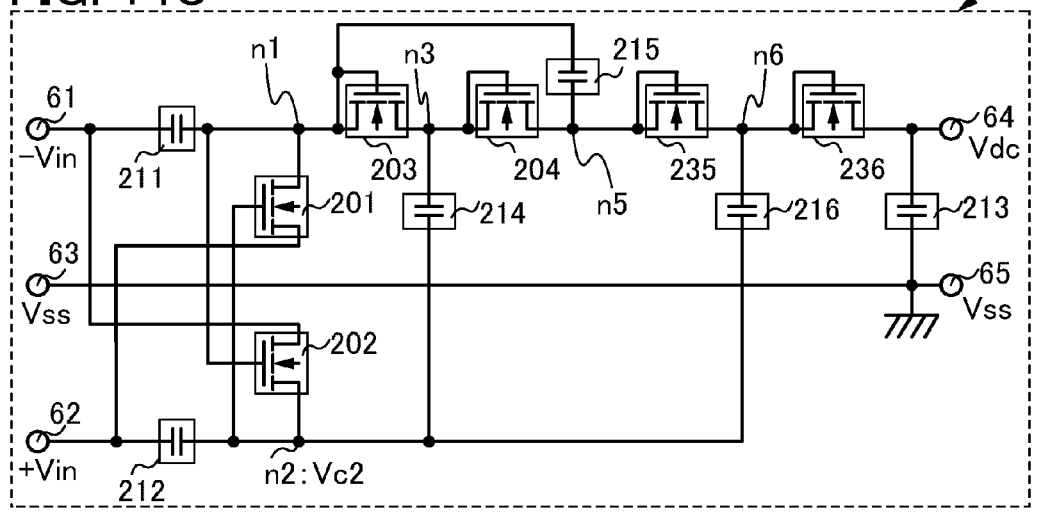

Alternatively, a structure including two voltage doubler circuits may be used. A rectifier circuit 290 including two voltage doubler circuits is illustrated in FIG. 14C. In the rectifier circuit 290, a first electrode of a sixth capacitor 216 is connected to the node n2 of the rectifier circuit 280. A second electrode of the sixth capacitor 216, the first electrode of the fifth transistor 235, and a gate electrode and a second electrode of a sixth transistor 236 are connected to form a node n6. The fourth terminal 64 and the first electrode of the third capacitor 213 are connected to a first electrode of the sixth transistor 236. In addition, the second electrode of the third capacitor 213 is grounded.

The increase in the number of voltage doubler circuits provided in a rectifier circuit can increase the voltage output to the fourth terminal 64. In addition, a rectifier circuit of which the drop in the output voltage by the threshold voltage of a first transistor used as a rectifier element is suppressed regardless of the number of voltage doubler circuits provided in the rectifier circuit can be provided. Further, a rectifier circuit whose variations in the output voltage are suppressed can be provided.

In addition, the number of voltage doubler circuits provided in a rectifier circuit is not limited, and a rectifier circuit may be designed in accordance with an intended purpose. A rectifier circuit of one embodiment of the present invention can include n (n is greater than or equal to zero) voltage doubler circuits.

This embodiment can be combined with any of the other embodiments in this specification, as appropriate.

Embodiment 2

Figure 8:
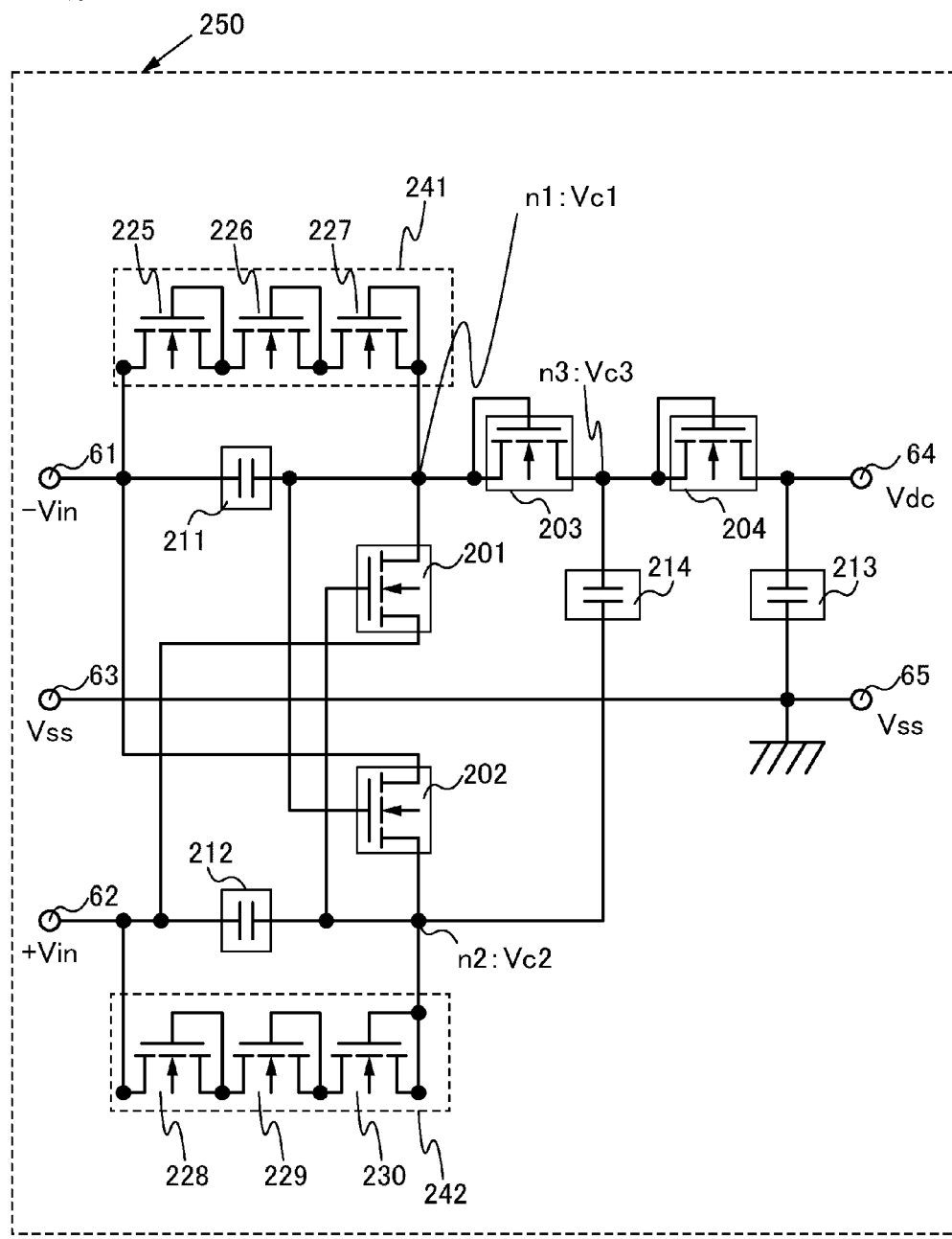
FIG. 8 illustrates a configuration of a rectifier circuit according to one embodiment.

In this embodiment, an example of a rectifier circuit in which a transistor whose gate electrode is connected to a second electrode through a capacitor is used as a rectifier element and a limiting circuit is provided so that the potential of the gate electrode of the transistor is not too high as compared to the potential of the second electrode is illustrated in FIG. 8.

A rectifier circuit 250 illustrated in FIG. 8 includes the first transistor 201, the second transistor 202, the third transistor 203, the fourth transistor 204, a fifth transistor 225, a sixth transistor 226, a seventh transistor 227, an eighth transistor 228, a ninth transistor 229, and a tenth transistor 230 which are n-channel enhancement transistors. Further, the rectifier circuit 250 includes the first capacitor 211, the second capacitor 212, the third capacitor 213, and the fourth capacitor 214. In addition, the rectifier circuit 250 includes the first terminal 61, the second terminal 62, the third terminal 63, the fourth terminal 64, and the fifth terminal 65.

The rectifier circuit 250 illustrated in FIG. 8 is the rectifier circuit 200 described in Embodiment 1 further including a first limiting circuit 241 which is in parallel with the first capacitor 211 and provided between the first terminal 61 and the node 1 and a second limiting circuit 242 which is in parallel with the second capacitor 212 and provided between the second terminal 62 and the node 2.

In this embodiment, the structures of the first limiting circuit 241 and the second limiting circuit 242 and a structure in which the rectifier circuit described in Embodiment 1 and the limiting circuits are connected to each other will be described. The description of Embodiment 1 is referred to for a portion having the same structure as that of the rectifier circuit 200 described in Embodiment 1.

In the first limiting circuit 241, a second electrode and a gate electrode of the fifth transistor 225 and a first electrode of the sixth transistor 226 are connected to each other, and a second electrode and a gate electrode of the sixth transistor 226 and a first electrode of the seventh transistor 227 are connected to each other.

In addition, a first electrode of the fifth transistor 225 is connected to the first terminal 61, and a gate electrode and a second electrode of the seventh transistor 227 are connected to the node 1.

In the second limiting circuit 242, a second electrode and a gate electrode of the eighth transistor 228 and a first electrode of the ninth transistor 229 are connected to each other, and a second electrode and a gate electrode of the ninth transistor 229 and a first electrode of the tenth transistor 230 are connected to each other.

In addition, a first electrode of the eighth transistor 228 is connected to the second terminal 62, and a gate electrode and a second electrode of the tenth transistor 230 are connected to the node 2.

When a plurality of rectifier elements each including a transistor is connected in series, the plurality of rectifier elements can be used as a limiting circuit.

When the threshold voltage of the fifth transistor 225 is Vth5, the threshold voltage of the sixth transistor 226 is Vth6, and the threshold voltage of the seventh transistor 227 is Vth7 in the first limiting circuit 241, the potential of the second electrode of the seventh transistor 227 becomes higher than the potential of the first electrode of the fifth transistor 225, and a difference between the potentials exceeds the sum of the threshold voltages of the fifth transistor 225, the sixth transistor 226, and the seventh transistor 227 (Vth5+Vth6+Vth7), whereby current flows from the node 1 to the first terminal 61 through the first limiting circuit 241.

Similarly, when the threshold voltage of the eighth transistor 228 is Vth8, the threshold voltage of the ninth transistor 229 is Vth9, and the threshold voltage of the tenth transistor 230 is Vth10 in the second limiting circuit 242, the potential of the second electrode of the tenth transistor 230 becomes higher than the potential of the first electrode of the eighth transistor 228, and a difference between the potentials exceeds the sum of the threshold voltages of the eighth transistor 228, the ninth transistor 229, and the tenth transistor 230 (Vth8+Vth9+Vth10), whereby current flows from the node 2 to the second terminal 62 through the second limiting circuit 242.

When the first limiting circuit 241 is provided in parallel with the first capacitor 211 between the first terminal 61 and the node 1, the potential of the node 1 can be limited so as not to be too high as compared to the potential of the first terminal 61. In addition, when the second limiting circuit 242 is provided in parallel with the second capacitor 212 between the second terminal 62 and the node 2, the potential of the node 2 can be limited so as not to be too high as compared to the potential of the second terminal 62.

The potential of the node 1 and the potential of the node 2 are limited, whereby a phenomenon that the first transistor 201 and the second transistor 202 are always in conduction can be prevented. In addition, in the case where the amplitude of the input voltage Vin is large, the output potential Vdc can be suppressed so as not to be too high, and deterioration and breakdown of a load circuit connected to the rectifier circuit can be prevented.

The rectifier circuit described in this embodiment is applied to a power source of a logic circuit, whereby stable voltage can be supplied to the logic circuit and the operation of the logic circuit is stabilized. The rectifier circuit is applied to a logic circuit (e.g., an RFID tag) which operates by the supply of power from a contactless power feeding device, whereby stable operation (e.g., reduction in defects of reading) can be realized even when the distance between the logic circuit and the contactless power feeding device varies.

The rectifier circuit described in this embodiment is applied, whereby a rectifier circuit of which the drop in the output voltage by the threshold voltage of the first transistor used as a rectifier element is suppressed can be provided. Further, a rectifier circuit whose variations in the output voltage are suppressed can be provided.

In addition, a semiconductor device which can operate even when power supplied from a contactless power feeding device is minute can be provided by using the rectifier circuit described in this embodiment. Further, a semiconductor device which stably operates even in the case where the amplitude of AC voltage supplied from a contactless power feeding device varies greatly can be provided.

This embodiment can be combined with any of the other embodiments in this specification, as appropriate.

Embodiment 3

Figure 9:
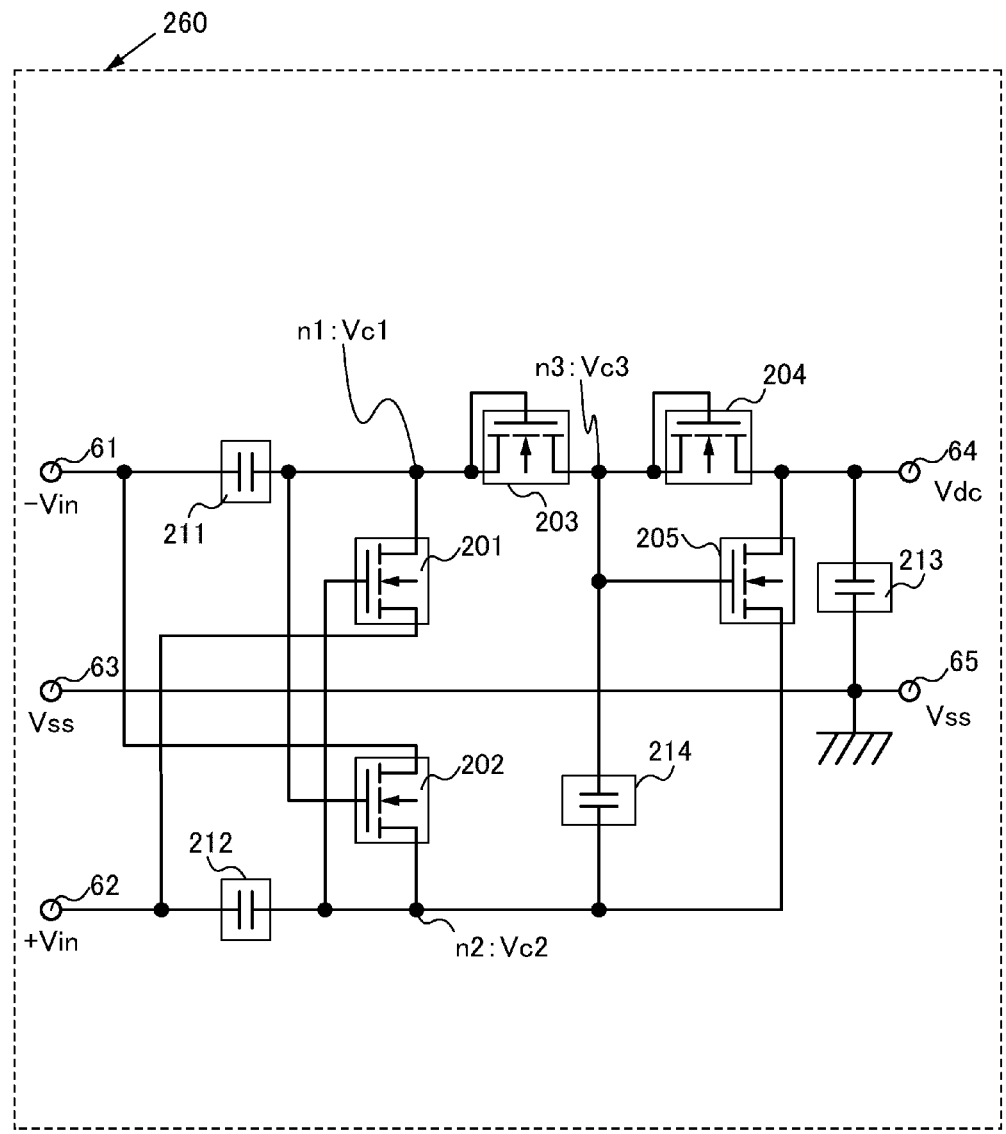
FIG. 9 illustrates a configuration of a rectifier circuit according to one embodiment.

In this embodiment, an example of a rectifier circuit in which a transistor whose gate electrode is connected to a second electrode through a capacitor is used as a rectifier element and provided at a position different from that in Embodiment 2, and the output voltage is limited is illustrated in FIG. 9.

A rectifier circuit 260 illustrated in FIG. 9 includes the first transistor 201, the second transistor 202, the third transistor 203, the fourth transistor 204, and a fifth transistor 205 which are n-channel enhancement transistors. Further, the rectifier circuit 260 includes the first capacitor 211, the second capacitor 212, the third capacitor 213, and the fourth capacitor 214. In addition, the rectifier circuit 260 includes the first terminal 61, the second terminal 62, the third terminal 63, the fourth terminal 64, and the fifth terminal 65.

In the rectifier circuit 260 illustrated in FIG. 9, the fifth transistor 205 is connected to the node 2, the node 3, and the fourth terminal of the rectifier circuit 200 described in Embodiment 1, and the potential Vdc output by the rectifier circuit 260 is limited.

In this embodiment, a structure in which the fifth transistor 205 is connected to the rectifier circuit described in Embodiment 1 will be described. The description of Embodiment 1 is referred to for a portion having the same structure as that of the rectifier circuit 200 described in Embodiment 1.

In the rectifier circuit 260, the fifth transistor 205 is added as a limiting circuit to the rectifier circuit described in Embodiment 1. Specifically, a gate electrode of the fifth transistor 205 is connected to the node 3, a first electrode of the fifth transistor 205 is connected to the node 2, and a second electrode of the fifth transistor 205 is connected to the fourth terminal 64.

The fifth transistor 205 functions as a limiting circuit. In the case where the potential Vdc of the fourth terminal is higher than the potential Vc2 of the node 2, when the potential Vc3 of the node 3 becomes higher than the potential Vc2 of the node 2 and a difference between the potentials exceeds the threshold voltage of the fifth transistor, current flows from the fourth terminal 64 to the node 2 through the fifth transistor.

When the fifth transistor 205 is provided, the potential Vdc of the fourth terminal 64 can be limited so as not to be too high and high voltage can be prevented from being applied to a circuit of a subsequent stage even when +Vin having a large absolute value or −Vin having a large absolute value is input to the first terminal 61 and the second terminal 62.

Accordingly, a rectifier circuit of which the drop in the output voltage by the threshold voltage of the first transistor used as a rectifier element is suppressed can be provided. Further, a rectifier circuit whose variations in the output voltage are suppressed can be provided.

In addition, a semiconductor device which can operate even when power supplied from a contactless power feeding device is minute can be provided by using the rectifier circuit described in this embodiment. Further, a semiconductor device which stably operates even in the case where the amplitude of AC voltage supplied from a contactless power feeding device varies greatly can be provided.

This embodiment can be combined with any of the other embodiments in this specification, as appropriate.

Embodiment 4

Figure 12:
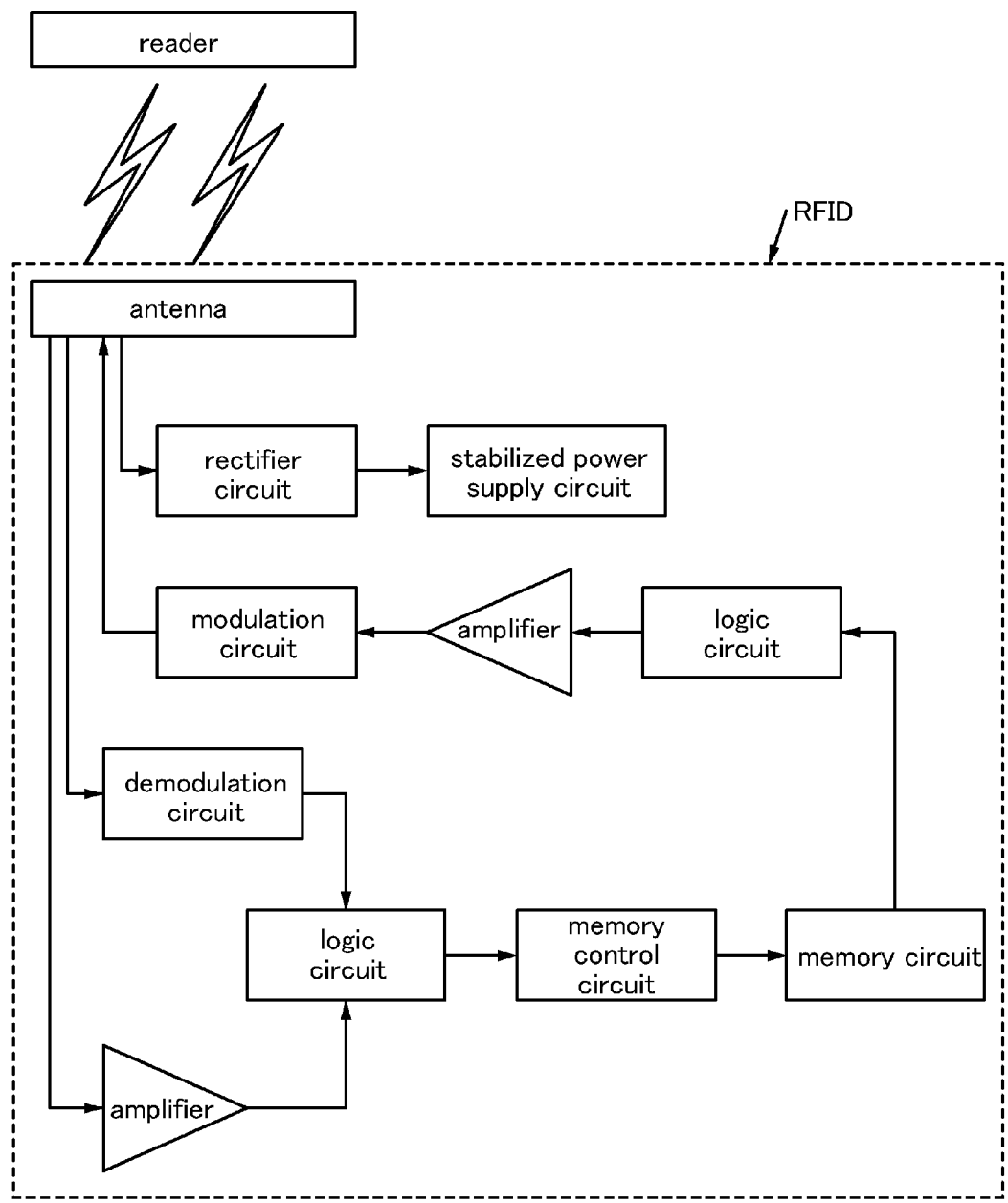
FIG. 12 is a block diagram illustrating a structure of a passive RFID tag according to one embodiment.

In this embodiment, a passive radio frequency identification (RFID) tag, to which the rectifier circuit described in Embodiments 1 to 3 including the rectifier element that is formed in such a way that the gate electrode of the transistor is connected to the second electrode of the transistor through the capacitor is applied, will be described with reference to FIG. 12.

A passive RFID tag described in this embodiment includes an antenna, a rectifier circuit, a stabilized power supply circuit, a demodulation circuit, amplifiers, logic circuits, a memory control circuit, a memory circuit, and a modulation circuit. Note that the passive RFID tag is operated by an electromagnetic wave emitted by a reader. Therefore, the reader is one embodiment of a contactless power feeding device.

The antenna receives an electromagnetic wave (e.g., 13.56 MHz) emitted by the reader.

The rectifier circuit is connected to the antenna and converts the electromagnetic wave received by the antenna into DC voltage, and supplies a power supply potential to another circuit through the stabilized power supply circuit. Note that the RFID tag described in this embodiment includes the rectifier circuit in which a rectifier element is formed in such a way that a gate electrode of a transistor is connected to a second electrode of the transistor through a capacitor. Specifically, the rectifier circuit described in Embodiments 1 to 3 can be used.

The amplifier generates a clock signal from the electromagnetic wave emitted by the reader and outputs it to the logic circuit. Alternatively, the amplifier shapes an electromagnetic wave (e.g., 13.56 MHz sine wave) into a square wave through a capacitor and an inverter, and outputs it as a clock signal to the logic circuit. A clock signal may be generated using an oscillator circuit.

The demodulation circuit demodulates a signal based on the electromagnetic wave which is modulated by the reader and outputs it to the logic circuit.

The logic circuit operates depending on the signal. As for the operation of the logic circuit, for example, the logic circuit reads data from the memory circuit through the memory control circuit and then outputs the read data to the modulation circuit through the amplifier.

The modulation circuit modulates a reflective wave and sends back the data read from the memory circuit to the reader.

In the RFID tag described in this embodiment, the rectifier circuit in which the rectifier element is formed in such a way that the gate electrode of the transistor is connected to the second electrode of the transistor through the capacitor is used; therefore, the RFID tag which has a long communication distance and which can efficiently convert AC power into DC power even when power supplied from the reader is minute.

In addition, even when power supplied from the reader varies greatly, variations in the output voltage are suppressed; therefore, an RFID tag which has a wide tolerance range with respect to a distance from the reader can be provided.

Embodiment 5

In this embodiment, a transistor which can be used as any of the rectifier circuits described in Embodiments 1 to 3 will be described.

A transistor forming a rectifier circuit of one embodiment of the present invention may be an n-channel enhancement transistor. Examples of a semiconductor used for a channel formation region include a semiconductor using a group 14 semiconductor (silicon, germanium, silicon carbide, or the like), a compound semiconductor (gallium arsenide, gallium nitride, or the like), an oxide semiconductor (zinc oxide, IGZO, or the like), or the like. A semiconductor used for a channel formation region may be a single crystal, a polycrystal, amorphous, or a mixture including any of these.

In this embodiment, a structure of a transistor whose channel formation region includes an oxide semiconductor as an example of an n-channel enhancement transistor, and an example of a manufacturing method thereof will be described with reference to FIGS. 13A to 13E.

<Structure of Transistor>

Figure 13A:
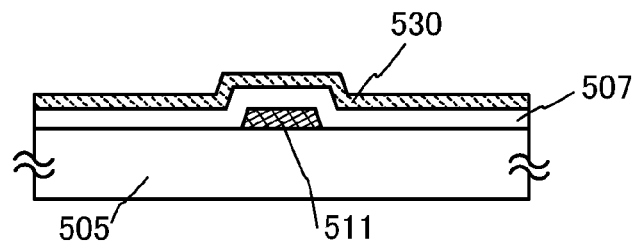
FIGS. 13A to 13E illustrate a configuration of a transistor according to one embodiment and a manufacturing process thereof.
Figure 13B:
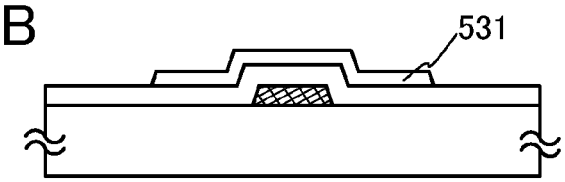
Figure 13C:
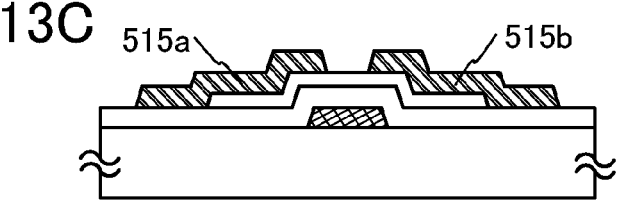
Figure 13D:
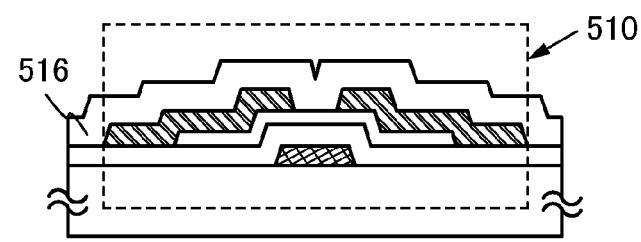
Figure 13E:
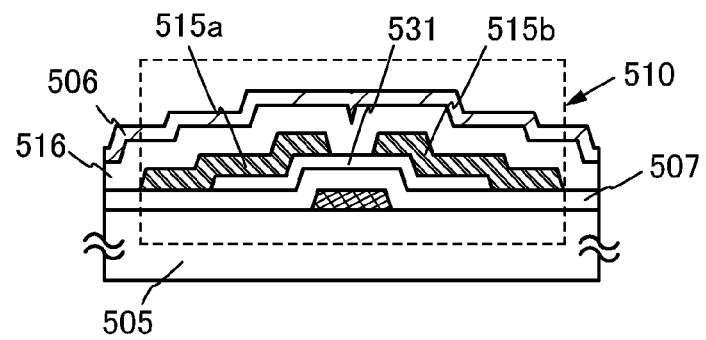

FIG. 13E illustrates a structure of an inverted staggered transistor 510 having a bottom-gate structure in which an oxide semiconductor is used for a channel formation region.

In the transistor 510, a gate electrode layer 511 and a gate insulating layer 507 which covers the gate electrode layer 511 are provided over a substrate 505 having an insulating surface. An oxide semiconductor layer 531 which overlaps with the gate electrode is provided over the gate insulating layer 507. In addition, a source electrode layer 515a and a drain electrode layer 515b, which are in contact with the oxide semiconductor layer 531 and have end portions which overlap with the gate electrode layer 511, are provided. Note that a channel is formed in a region of the oxide semiconductor layer 531 in contact with the gate insulating layer over the gate electrode layer 511 and overlapped with a portion between the source electrode layer 515a and the drain electrode layer 515b. A first insulating layer 516 is provided over the source electrode layer 515a, the drain electrode layer 515b, and the oxide semiconductor layer 531, and a second insulating layer 506 is formed over the first insulating layer 516.

An oxide semiconductor used for a semiconductor layer in this embodiment is an i-type (intrinsic) or substantially i-type oxide semiconductor. The i-type (intrinsic) or substantially i-type oxide semiconductor is obtained in such a manner that hydrogen, which functions as an n-type impurity, is removed, and the oxide semiconductor is highly purified so as to contain as few impurities that are not main components of the oxide semiconductor as possible.

Note that the highly-purified oxide semiconductor includes extremely few carriers, and the carrier density is lower than $1 \times 10^{14}/cm^3$, preferably lower than $1 \times 10^{12}/cm^3$, further preferably lower than $1 \times 10^{11}/cm^3$. Such few carriers enable a current in an off state (off-state current) to be small enough.

Specifically, in the transistor including the oxide semiconductor layer, the leakage current density (off-state current density) per micrometer of a channel width between the source and the drain in an off state can be less than or equal to 100 zA/μm ($1 \times 10^{-19}$ A/μm), preferably less than or equal to 10 zA/μm ($1 \times 10^{-20}$ A/μm), and further preferably less than or equal to 1 zA/μm ($1 \times 10^{-21}$ A/μm) at a source-drain voltage of 3.5 V and at ambient temperature (e.g., 25° C.).

In the transistor including a highly-purified oxide semiconductor layer, the temperature dependence of on-state current is hardly observed, and off-state current remains extremely low at a high temperature.

Steps of manufacturing the transistor in which an oxide semiconductor is used for a channel formation region over the substrate 505 are described below with reference to FIGS. 13A to 13E.

<1. Substrate Having Insulating Surface>

First, a conductive film is formed over the substrate 505 having an insulating surface, and then the gate electrode layer 511 is formed in a first photolithography step. Note that a resist mask may be formed by an inkjet method. Formation of the resist mask by an inkjet method needs no photomask; thus, manufacturing cost can be reduced.

There is no particular limitation on the substrate 505 as long as the substrate 505 has an insulating surface and has a gas barrier property with respect to water vapor and a hydrogen gas; it is necessary that the substrate 505 have at least heat resistance enough to withstand heat treatment in the case where the heat treatment is to be performed in a later step. For example, a glass substrate of barium borosilicate glass, aluminoborosilicate glass, or the like, a quartz substrate, a sapphire substrate, a ceramic substrate, or the like may be used. Alternatively, a metal substrate containing stainless steel or a semiconductor substrate having an insulating film formed on its surface may be used. There is a tendency that a flexible substrate formed using a synthetic resin such as plastics generally has a lower upper temperature limit than the above substrates; however, such a substrate can be used as long as it can withstand processing temperature in manufacturing steps. Note that the surface of the substrate 505 may be planarized by polishing such as a CMP method.

In this embodiment, a glass substrate is used as the substrate 505 having an insulating surface.

An insulating layer serving as a base may be provided between the substrate 505 and the gate electrode layer 511. The insulating layer has a function of preventing diffusion of an impurity element from the substrate 505, and can be formed with a single-layer structure or a layered structure using one or more of a silicon nitride film, a silicon oxide film, a silicon nitride oxide film, and a silicon oxynitride film.

<2. Gate Electrode Layer>

The gate electrode layer 511 can be formed to have a single-layer structure or a layered structure using a metal material such as molybdenum, titanium, chromium, tantalum, tungsten, neodymium, or scandium, or an alloy material containing any of these materials as its main component. Note that aluminum or copper can also be used as such a metal material if it can withstand the temperature of heat treatment to be performed in a later step. Aluminum or copper is preferably combined with a refractory metal material so as to prevent a heat resistance problem and a corrosive problem. As the refractory metal material, molybdenum, titanium, chromium, tantalum, tungsten, neodymium, scandium, or the like can be used.

<3. Gate Insulating Layer>

Next, the gate insulating layer 507 is formed over the gate electrode layer 511. The gate insulating layer 507 can be formed using a plasma-enhanced CVD method, a sputtering method, or the like. The gate insulating layer 507 can be formed to have a single-layer structure or a layered structure using one or more films selected from a silicon oxide film, a silicon nitride film, a silicon oxynitride film, a silicon nitride oxide film, an aluminum oxide film, an aluminum nitride film, an aluminum oxynitride film, an aluminum nitride oxide film, a hafnium oxide film, a tantalum oxide film, a gallium oxide film, and the like.

For the oxide semiconductor in this embodiment, an oxide semiconductor which is made to be an i-type semiconductor or a substantially i-type semiconductor by removing an impurity (a highly-purified oxide semiconductor) is used. Such a highly-purified oxide semiconductor is highly sensitive to an interface state and interface charge; thus, an interface between the oxide semiconductor layer and the gate insulating layer is important. For that reason, the gate insulating layer that is to be in contact with the highly-purified oxide semiconductor needs to have high quality.

For example, a high-density plasma-enhanced CVD method using microwaves (e.g., a frequency of 2.45 GHz) is preferably employed because an insulating layer can be dense and can have high withstand voltage and high quality. The highly-purified oxide semiconductor and the high-quality gate insulating layer are in close contact with each other, whereby the interface state density can be reduced to obtain favorable interface characteristics.

Needless to say, another film formation method such as a sputtering method or a plasma-enhanced CVD method can be employed as long as the method enables formation of a good-quality insulating layer as a gate insulating layer. Further, an insulating layer whose film quality and characteristics of the interface between the insulating layer and an oxide semiconductor are improved by heat treatment which is performed after formation of the insulating layer may be formed as a gate insulating layer. In any case, any insulating layer may be used as long as the insulating layer has characteristics of enabling reduction in interface state density of the interface between the insulating layer and an oxide semiconductor and formation of a favorable interface as well as having favorable film quality as a gate insulating layer.

The gate insulating layer 507 is to be in contact with an oxide semiconductor layer formed later. Since semiconductor characteristics are impaired when hydrogen diffuses into the oxide semiconductor layer, the gate insulating layer 507 desirably does not contain hydrogen, a hydroxyl group, and moisture. In order that hydrogen, a hydroxyl group, and moisture are contained as little as possible in the gate insulating layer 507 and an oxide semiconductor film 530, it is preferable that the substrate 505 over which the gate electrode layer 511 is formed or the substrate 505 over which the gate electrode layer 511 and the gate insulating layer 507 are formed be preheated in a preheating chamber of a sputtering apparatus as pretreatment for the formation of the oxide semiconductor film 530 to eliminate and remove impurities such as hydrogen and moisture adsorbed onto the substrate 505. The temperature for the preheating is higher than or equal to 100° C. and lower than or equal to 400° C., preferably higher than or equal to 150° C. and lower than or equal to 300° C. As an evacuation unit provided in the preheating chamber, a cryopump is preferable. Note that this preheating treatment can be omitted. Further, this preheating treatment may be performed in a similar manner on the substrate 505 over which layers up to and including the source electrode layer 515a and the drain electrode layer 515b are formed before formation of the first insulating layer 516.

<4. Oxide Semiconductor Layer>

Next, over the gate insulating layer 507, the oxide semiconductor film 530 with a thickness greater than or equal to 2 nm and less than or equal to 200 nm, preferably greater than or equal to 5 nm and less than or equal to 30 nm is formed (see FIG. 13A).

The oxide semiconductor film is formed by a sputtering method using an oxide semiconductor target. Moreover, the oxide semiconductor film can be formed by a sputtering method under a rare gas (e.g., argon) atmosphere, an oxygen atmosphere, or a mixed atmosphere of a rare gas (e.g., argon) and oxygen.

Note that before the oxide semiconductor film 530 is formed by a sputtering method, powdery substances (also referred to as particles or dust) attached to a surface of the gate insulating layer 507 are preferably removed by reverse sputtering in which plasma is generated by introduction of an argon gas. The reverse sputtering refers to a method in which an RF power supply is used for application of voltage to a substrate in an argon atmosphere and plasma is generated in the vicinity of the substrate to modify a surface. Note that instead of an argon atmosphere, a nitrogen atmosphere, a helium atmosphere, an oxygen atmosphere, or the like may be used.

As an oxide semiconductor used for the oxide semiconductor film 530, the following metal oxide can be used: a four-component metal oxide such as an In—Sn—Ga—Zn—O-based oxide semiconductor; a three-component metal oxide such as an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, a Sn—Al—Zn—O-based oxide semiconductor; a two-component metal oxide such as an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, an In—Mg—O-based oxide semiconductor, an In—Ga—O-based oxide semiconductor; an In—O-based oxide semiconductor, a Sn—O-based oxide semiconductor, a Zn—O-based oxide semiconductor, or the like. Further, silicon oxide may be contained in the above oxide semiconductor film. Addition of silicon oxide ($SiO_x$ (x>0)) which hinders crystallization into the oxide semiconductor film can suppress crystallization of the oxide semiconductor film at the time when heat treatment is performed after formation of the oxide semiconductor film in the manufacturing process. The oxide semiconductor film preferably exists in an amorphous state; however, the oxide semiconductor film may be partly crystallized. Here, for example, an In—Ga—Zn—O-based oxide semiconductor means an oxide film containing indium (In), gallium (Ga), and zinc (Zn), and there is no particular limitation on the composition ratio thereof. The In—Ga—Zn—O-based oxide semiconductor may contain an element other than In, Ga, and Zn.

In addition, for the oxide semiconductor film 530, a thin film of a material represented by the chemical formula, $InMO_3(ZnO)_m$ (m>0), can be used. Here, M represents one or more metal elements selected from Ga, Al, Mn, and Co. For example, M can be Ga, Ga and Al, Ga and Mn, Ga and Co, or the like.

The oxide semiconductor preferably includes In, and further preferably includes In and Ga. In order to obtain an i-type (intrinsic) oxide semiconductor layer, dehydration or dehydrogenation is effective. In this embodiment, the oxide semiconductor film 530 is deposited by a sputtering method with the use of an In—Ga—Zn—O-based oxide target. A cross-sectional view of this stage is illustrated in FIG. 13A.

As the target for forming the oxide semiconductor film 530 by a sputtering method, for example, an oxide target having a composition ratio of $In_2O_3:Ga_2O_3:ZnO=1:1:1$ [molar ratio] is used to form an In—Ga—Zn—O film. Without limitation to the material and the component of the target, for example, an oxide target having a composition ratio of $In_2O_3:Ga_2O_3:ZnO=1:1:2$ [molar ratio] or $In_2O_3:Ga_2O_3:ZnO=1:1:4$ [molar ratio] may be used.

The filling rate of the oxide target is higher than or equal to 90% and lower than or equal to 100%, preferably higher than or equal to 95% and lower than or equal to 99.9%. With the use of the metal oxide target with high filling rate, a dense oxide semiconductor film can be formed.

It is preferable that a high-purity gas from which impurities such as hydrogen, water, a hydroxyl group, or hydride have been removed be used as a sputtering gas used for the formation of the oxide semiconductor film 530.

The substrate is held in a deposition chamber kept under reduced pressure, and the substrate temperature is set to higher than or equal to 100° C. and lower than or equal to 600° C., preferably higher than or equal to 200° C. and lower than or equal to 400° C. By forming the oxide semiconductor film in a state where the substrate is heated, the concentration of impurities included in the formed oxide semiconductor film can be reduced. In addition, damage by sputtering can be reduced. Then, a sputtering gas from which hydrogen and moisture have been removed is introduced into the deposition chamber while moisture remaining therein is removed, and the oxide semiconductor film 530 is formed over the substrate 505 with the use of the above target. In order to remove moisture remaining in the deposition chamber, an entrapment vacuum pump such as a cryopump, an ion pump, or a titanium sublimation pump is preferably used. Further, an evacuation unit may be a turbo pump provided with a cold trap. In the deposition chamber which is evacuated with the cryopump, a hydrogen atom, a compound containing a hydrogen atom, such as water ($H_2O$), (more preferably, also a compound containing a carbon atom), and the like are removed, whereby the concentration of impurities in the oxide semiconductor film formed in the deposition chamber can be reduced.

As an example of the deposition condition, the distance between the substrate and the target is 100 mm, the pressure is 0.6 Pa, the direct-current (DC) power source is 0.5 kW, and the atmosphere is an oxygen atmosphere (the proportion of the oxygen flow rate is 100%). Note that a pulsed direct-current power source is preferably used, in which case powder substances (also referred to as particles or dust) that are generated in deposition can be reduced and the film thickness can be uniform.

Note that impurities, for example, an alkali metal such as Li or Na and an alkaline earth metal such as Ca contained in the oxide semiconductor film are preferably reduced. Specifically, the concentrations of Li, Na, and K detected by SIMS are each lower than or equal to $5 \times 10^{15}$ cm$^{-3}$, preferably lower than or equal to $1 \times 10^{15}$ cm$^{-3}$.

An alkali metal and an alkaline earth metal are adverse impurities for the oxide semiconductor and are preferably contained as little as possible. An alkali metal, in particular, Na diffuses into an oxide and becomes Na$^+$ when an insulating film in contact with the oxide semiconductor is an oxide. In addition, Na cuts a bond between metal and oxygen or enters the bond in the oxide semiconductor. As a result, transistor characteristics deteriorate (e.g., the transistor becomes normally-on (the shift of a threshold voltage to a negative side) or the mobility is decreased). In addition, this also causes variation in the characteristics. Such a problem is significant especially in the case where the hydrogen concentration in the oxide semiconductor is extremely low. Therefore, the concentration of an alkali metal is strongly required to set to the above value in the case where the hydrogen concentration in the oxide semiconductor is lower than or equal to $5 \times 10^{19}$ cm$^{-3}$, particularly lower than or equal to $5 \times 10^{18}$ cm$^{-3}$.

Next, the oxide semiconductor film 530 is processed into an island-shaped oxide semiconductor layer in a second photolithography step. A resist mask for forming the island-shaped oxide semiconductor layer may be formed by an inkjet method. Formation of the resist mask by an inkjet method needs no photomask; thus, manufacturing cost can be reduced.

In the case where a contact hole is formed in the gate insulating layer 507, a step of forming the contact hole can be performed at the same time as processing of the oxide semiconductor film 530.

Note that etching of the oxide semiconductor film 530 may be dry etching, wet etching, or both dry etching and wet etching. As an etchant used for wet etching of the oxide semiconductor film 530, for example, a mixed solution of phosphoric acid, acetic acid, and nitric acid can be used. Alternatively, ITO-07N (produced by Kanto Chemical Co., Inc.) may be used.

As an etching gas used for dry etching, a gas containing chlorine (a chlorine-based gas such as chlorine (Cl$_2$), boron trichloride (BCl$_3$), silicon tetrachloride (SiCl$_4$), or carbon tetrachloride (CCl$_4$)) is preferable. Alternatively, a gas containing fluorine (a fluorine-based gas such as carbon tetrafluoride (CF$_4$), sulfur hexafluoride (SF$_6$), nitrogen trifluoride (NF$_3$), or trifluoromethane (CHF$_3$)), hydrogen bromide (HBr), oxygen (O$_2$), any of these gases to which a rare gas such as helium (He) or argon (Ar) is added, or the like can be used.

As the dry etching method, a parallel plate reactive ion etching (RIE) method or an inductively coupled plasma (ICP) etching method can be used. In order to etch the film into desired shapes, the etching condition (the amount of power applied to a coil-shaped electrode, the amount of power applied to an electrode on a substrate side, the temperature of the electrode on the substrate side, or the like) is adjusted as appropriate.

Next, the oxide semiconductor layer is subjected to first heat treatment. The oxide semiconductor layer can be dehydrated or dehydrogenated by this first heat treatment. The temperature of the first heat treatment is higher than or equal to 250° C. and lower than or equal to 750° C., or higher than or equal to 400° C. and lower than the strain point of the substrate. For example, the first heat treatment may be performed at 500° C. for approximately longer than or equal to 3 minutes and shorter than or equal to 6 minutes. By using a rapid thermal annealing (RTA) method for the heat treatment, dehydration or dehydrogenation can be performed in a short time; therefore, the treatment can be performed even at a temperature higher than the strain point of a glass substrate.

Here, the substrate is put in an electric furnace which is a kind of heat treatment apparatus and heat treatment is performed on the oxide semiconductor layer at 450° C. in a nitrogen atmosphere for one hour, and then water or hydrogen is prevented from entering the oxide semiconductor layer without exposure to the air; thus, the oxide semiconductor layer 531 is obtained (see FIG. 13B).

Further, the heat treatment apparatus is not limited to an electric furnace, and an apparatus for heating an object to be processed by heat conduction or heat radiation from a heating element such as a resistance heating element may be alternatively used. For example, a rapid thermal anneal (RTA) apparatus such as a gas rapid thermal anneal (GRTA) apparatus or a lamp rapid thermal anneal (LRTA) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high-temperature gas. As the high-temperature gas, an inert gas which does not react with an object to be processed by heat treatment, such as nitrogen or a rare gas like argon, is used.

For example, as the first heat treatment, GRTA by which the substrate is moved into an inert gas heated to a high temperature as high as 650° C. to 700° C., heated for several minutes, and moved out of the inert gas heated to the high temperature may be performed.

Note that in the first heat treatment, it is preferable that water, hydrogen, and the like be not contained in the atmosphere of nitrogen or a rare gas such as helium, neon, or argon. It is preferable that the purity of nitrogen or the rare gas such as helium, neon, or argon which is introduced into a heat treatment apparatus be set to be 6N (99.9999%) or higher, more preferably 7N (99.99999%) or higher (that is, the impurity concentration is 1 ppm or lower, preferably 0.1 ppm or lower).

In addition, after the oxide semiconductor layer is heated by the first heat treatment, a high-purity oxygen gas, a high-purity N$_2$O gas, or ultra dry air (the moisture amount is less than or equal to 20 ppm (−55° C. by conversion into a dew point), preferably less than or equal to 1 ppm, more preferably less than or equal to 10 ppb, in the case where measurement is performed with the use of a dew point meter of a cavity ring down laser spectroscopy (CRDS) system) may be introduced into the same furnace. It is preferable that the oxygen gas and the N$_2$O gas do not include water, hydrogen, and the like. The purity of the oxygen gas or the N$_2$O gas which is introduced into the heat treatment apparatus is preferably 6N or higher, more preferably 7N or higher (i.e., the concentration of impurities in the oxygen gas or the $N_2O$ gas is 1 ppm or lower, preferably 0.1 ppm or lower). Oxygen which is a main component of an oxide semiconductor and has been reduced because of the step of removing impurities through the dehydration or the dehydrogenation is supplied by the action of an oxygen gas or an $N_2O$ gas, whereby the purity of the oxide semiconductor layer is increased and the oxide semiconductor layer is made to be electrically i-type (intrinsic).

In addition, the first heat treatment for the oxide semiconductor layer can also be performed on the oxide semiconductor film 530 which has not been processed into the island-shaped oxide semiconductor layer. In that case, the substrate is taken out from the heating apparatus after the first heat treatment, and then a photolithography step is performed.

Note that the first heat treatment may be performed at either of the following timings without limitation to the above-described timing as long as it is performed after the oxide semiconductor layer is formed: after a source electrode layer and a drain electrode layer are formed over the oxide semiconductor layer; and after an insulating layer is formed over the source electrode layer and the drain electrode layer.

In the case where a contact hole is formed in the gate insulating layer 507, the formation of the contact hole may be performed before or after the first heat treatment is performed on the oxide semiconductor film 530.

Through the above-described steps, the concentration of hydrogen in the island-shaped oxide semiconductor layer can be reduced and the island-shaped oxide semiconductor layer can be highly purified. Accordingly, the oxide semiconductor layer can be stable. In addition, heat treatment at a temperature which is lower than or equal to the glass transition temperature makes it possible to form an oxide semiconductor layer with extremely low carrier density and a wide band gap. Therefore, the transistor can be manufactured using a large-sized substrate, so that the productivity can be increased. In addition, by using the oxide semiconductor layer in which the hydrogen concentration is reduced and the purity is improved, it is possible to manufacture a transistor with high withstand voltage and an extremely small off-state current. The above heat treatment can be performed at any time as long as it is performed after the oxide semiconductor layer is formed.

In addition, as the oxide semiconductor layer, an oxide semiconductor layer having a crystal region with a large thickness (a single crystal region), that is, a crystal region which is c-axis-aligned perpendicularly to a surface of the film may be formed by performing deposition twice and heat treatment twice, even when any of an oxide, a nitride, a metal, or the like is used for a material of a base component. For example, a first oxide semiconductor film with a thickness greater than or equal to 3 nm and less than or equal to 15 nm is formed and then first heat treatment is performed at a temperature higher than or equal to 450° C. and lower than or equal to 850° C., preferably higher than or equal to 550° C. and lower than or equal to 750° C. in an atmosphere of nitrogen, oxygen, a rare gas, or dry air, whereby a first oxide semiconductor film having a crystal region (including plate-like crystals) in a region including a surface is formed. Then, a second oxide semiconductor film which is thicker than the first oxide semiconductor film is formed and then second heat treatment is performed at a temperature higher than or equal to 450° C. and lower than or equal to 850° C., preferably higher than or equal to 600° C. and lower than or equal to 700° C., so that crystal growth proceeds upward with the use of the first oxide semiconductor film as a seed of the crystal growth, whereby the whole second oxide semiconductor film is crystallized. In such a manner, the oxide semiconductor layer having a crystal region with a large thickness may be formed.

<5. Source Electrode Layer and Drain Electrode Layer>

Next, a conductive film which serves as a source electrode layer and a drain electrode layer (including a wiring formed using the same layer as the source electrode layer and the drain electrode layer) is formed over the gate insulating layer 507 and the oxide semiconductor layer 531. For the conductive film serving as the source electrode layer and the drain electrode layer, for example, a metal film containing an element selected from Al, Cr, Cu, Ta, Ti, Mo, and W, an alloy film containing any of these elements as a component, a metal nitride film thereof (such as a titanium nitride film, a molybdenum nitride film, or a tungsten nitride film), or the like can be used. In addition, in order to solve a heat resistance problem and a corrosive problem, a structure in which a film of a metal such as Al or Cu has, on one of or on both the bottom side and the top side, a film of a refractory metal such as Ti, Mo, W, Cr, Ta, Nd, Sc, or Y, or a metal nitride film thereof (such as a titanium nitride film, a molybdenum nitride film, or a tungsten nitride film) may be used.

Further, the conductive film may have a single-layer structure or a layered structure of two or more layers. For example, a single-layer structure of an aluminum film containing silicon; a two-layer structure of an aluminum film and a titanium film stacked thereover; a three-layer structure in which a titanium film, an aluminum film, and a titanium film are stacked in this order; and the like can be given.

Alternatively, the conductive film may be formed using conductive metal oxide. As the conductive metal oxide, indium oxide, tin oxide, zinc oxide, an alloy of indium oxide and tin oxide, an alloy of indium oxide and zinc oxide, or the metal oxide material containing silicon or silicon oxide can be used.

Note that in the case where heat treatment is performed after the conductive film is formed, the conductive film preferably has heat resistance high enough to withstand the heat treatment.

A resist mask is formed over the conductive film in a third photolithography step, and the source electrode layer 515a and the drain electrode layer 515b are formed by selective etching; then, the resist mask is removed (see FIG. 13C).

Light exposure at the time of the formation of the resist mask in the third photolithography step may be performed using ultraviolet light, KrF laser light, or ArF laser light. A channel length L of a transistor that is formed later is determined by a distance between bottom end portions of the source electrode layer and the drain electrode layer, which are adjacent to each other over the oxide semiconductor layer 531. In the case where light exposure is performed for a channel length L of less than 25 nm, the light exposure at the time of the formation of the resist mask in the third photolithography step may be performed using extreme ultraviolet light having an extremely short wavelength of several nanometers to several tens of nanometers. In the light exposure by extreme ultraviolet light, the resolution is high and the focus depth is large. Accordingly, the channel length L of the transistor to be formed later can be greater than or equal to 10 nm and less than or equal to 1000 nm, and the circuit can operate at higher speed.

Note that it is preferable that etching conditions be optimized so as not to etch and divide the oxide semiconductor layer 531 when the conductive film is etched. However, it is difficult to obtain conditions under which only the conductive film is etched and the oxide semiconductor layer 531 is not etched at all. Therefore, in some cases, only part of the oxide semiconductor layer 531 is etched to be an oxide semiconductor layer having a groove (a recessed portion) at the time of etching of the conductive film.

In this embodiment, since a Ti film is used as the conductive film and an In—Ga—Zn—O-based oxide semiconductor is used for the oxide semiconductor layer 531, an ammonia hydrogen peroxide mixture (a mixed solution of ammonia, water, and a hydrogen peroxide solution) is used as an etchant. When the ammonia hydrogen peroxide mixture is used as an etchant, the conductive film can be selectively etched.

<6. First Insulating Layer>

Next, by plasma treatment using a gas such as $N_2O$, $N_2$, or Ar, water or the like adsorbed to a surface of an exposed portion of the oxide semiconductor layer may be removed. Plasma treatment may be performed using a mixture gas of oxygen and argon as well. In the case where the plasma treatment is performed, the first insulating layer 516 which serves as a protective insulating film in contact with part of the oxide semiconductor layer is formed without being exposed to air.

The first insulating layer 516 preferably contains as few impurities such as moisture, hydrogen, and oxygen as possible, and may be formed using an insulating film of a single layer or a plurality of insulating films stacked. The first insulating layer 516 can be formed to a thickness of at least 1 nm by a method by which impurities such as water and hydrogen do not enter the first insulating layer 516, such as a sputtering method, as appropriate. When hydrogen is contained in the first insulating layer 516, the hydrogen enters the oxide semiconductor layer or extracts oxygen from the oxide semiconductor layer, which causes a reduction in resistance of a back channel of the oxide semiconductor layer (i.e., makes an n-type back channel), so that a parasitic channel might be formed. Therefore, it is important that a formation method in which hydrogen is not used be employed so that the first insulating layer 516 contains hydrogen as little as possible.

The first insulating layer 516 is preferably formed using a material having a high barrier property. For example, a silicon nitride film, a silicon nitride oxide film, an aluminum nitride film, an aluminum nitride oxide film, an aluminum oxide film, a gallium oxide film, or the like can be used as the insulating film having a high barrier property. By using the insulating film having a high barrier property, impurities such as moisture or hydrogen can be prevented from entering the island-shaped oxide semiconductor layer, the gate insulating layer, or the interface between the island-shaped oxide semiconductor layer and another insulating layer and the vicinity thereof.

For example, an insulating film having a structure in which an aluminum oxide film with a thickness of 100 nm formed by a sputtering method is stacked over a gallium oxide film with a thickness of 200 nm formed by a sputtering method may be formed. The substrate temperature at the time of deposition is in the range of room temperature to 300° C. Further, the insulating film preferably contains much oxygen that exceeds the stoichiometric proportion, more preferably contains oxygen more than one time and less than two times the stoichiometric proportion. When the insulating film thus contains excessive oxygen, oxygen is supplied to the interface with the island-shaped oxide semiconductor film; thus, oxygen deficiency can be reduced.

In this embodiment, a silicon oxide film is formed to a thickness of 200 nm as the first insulating layer 516 by a sputtering method. The substrate temperature in film formation may be higher than or equal to room temperature and lower than or equal to 300° C. and in this embodiment, is 100° C. The silicon oxide film can be formed by a sputtering method in a rare gas (typically, argon) atmosphere, an oxygen atmosphere, or a mixed atmosphere of a rare gas and oxygen.

As a target, a silicon oxide target or a silicon target may be used. For example, the silicon oxide film can be formed using a silicon target by a sputtering method in an atmosphere containing oxygen. As the first insulating layer 516 which is formed in contact with the oxide semiconductor layer, an inorganic insulating film which does not contain impurities such as moisture, a hydrogen ion, and OH⁻ and blocks the entry of these impurities from the outside is used. Typically, a silicon oxide film, a silicon oxynitride film, an aluminum oxide film, an aluminum oxynitride film, or the like is used.

As in the case of forming the oxide semiconductor film 530, an entrapment vacuum pump (e.g., a cryopump) is preferably used in order to remove moisture remaining in a deposition chamber used for forming the first insulating layer 516. The first insulating layer 516 is formed in a deposition chamber in which evacuation has been performed with a cryopump, whereby the concentration of impurities in the first insulating layer 516 can be reduced. A turbo pump provided with a cold trap may be used as an evacuation unit for removing moisture remaining in the deposition chamber used for forming the first insulating layer 516.

It is preferable that a high-purity gas from which impurities such as hydrogen, water, a hydroxyl group, or hydride have been removed be used as a sputtering gas for the formation of the first insulating layer 516.

Note that second heat treatment may be performed after the first insulating layer 516 is formed. The heat treatment is performed in a nitrogen atmosphere, an atmosphere of ultra-dry air, or a rare gas (e.g., argon, helium) atmosphere preferably at a temperature higher than or equal to 200° C. and lower than or equal to 400° C., for example, higher than or equal to 250° C. and lower than or equal to 350° C. It is desirable that the content of water in the gas be 20 ppm or lower, preferably 1 ppm or lower, and more preferably 10 ppb or lower. For example, the heat treatment is performed at 250° C. in a nitrogen atmosphere for one hour. Alternatively, RTA treatment may be performed at high temperature for a short time as in the first heat treatment. Even when oxygen deficiency is generated in the island-shaped oxide semiconductor layer by the first heat treatment, by performing heat treatment after the first insulating layer 516 containing oxygen is provided, oxygen is supplied to the island-shaped oxide semiconductor layer from the first insulating layer 516. By supplying oxygen to the island-shaped oxide semiconductor layer, oxygen deficiency that serves as a donor is reduced in the island-shaped oxide semiconductor layer and the stoichiometric proportion can be satisfied. As a result, the island-shaped oxide semiconductor layer can be made to be substantially i-type and variation in electrical characteristics of the transistor due to oxygen deficiency can be reduced, which results in improvement in electrical characteristics. The timing of this second heat treatment is not particularly limited as long as it is after the formation of the first insulating layer 516, and this second heat treatment can be performed without increasing the number of steps by doubling as another step such as heat treatment in formation of a resin film or heat treatment for reduction of the resistance of a light-transmitting conductive film, and thereby the island-shaped oxide semiconductor layer can be made to be substantially i-type.

Moreover, the oxygen deficiency that serves as a donor in the island-shaped oxide semiconductor layer may be reduced by subjecting the island-shaped oxide semiconductor layer to heat treatment in an oxygen atmosphere so that oxygen is added to the oxide semiconductor. The heat treatment is performed at a temperature of, for example, higher than or equal to 100° C. and lower than 350° C., preferably higher than or equal to 150° C. and lower than 250° C. It is preferable that an oxygen gas used for the heat treatment under an oxygen atmosphere do not include water, hydrogen, or the like. Alternatively, the purity of the oxygen gas which is introduced into the heat treatment apparatus is preferably 6N (99.9999%) or higher, more preferably 7N (99.99999%) or higher (that is, the impurity concentration in the oxygen is less than or equal to 1 ppm, or preferably less than or equal to 0.1 ppm).

In this embodiment, the second heat treatment is performed in an inert gas atmosphere or an oxygen gas atmosphere (preferably at higher than or equal to 200° C. and lower than or equal to 400° C., for example, higher than or equal to 250° C. and lower than or equal to 350° C.). For example, the second heat treatment is performed in a nitrogen atmosphere at 250° C. for one hour. In the second heat treatment, part of the oxide semiconductor layer (a channel formation region) is heated while being in contact with the first insulating layer 516.

The second heat treatment has the following effect. By the above first heat treatment, in some cases, whereas an impurity such as hydrogen, moisture, a hydroxyl group, or hydride (also referred to as a hydrogen compound) is intentionally removed from the oxide semiconductor layer, oxygen which is one of main components of the oxide semiconductor is reduced. Since the second heat treatment supplies oxygen to the oxide semiconductor layer subjected to the first heat treatment, the oxide semiconductor layer is purified to become an electrically i-type (intrinsic) semiconductor.

Through the above steps, the transistor is formed (see FIG. 13D). The transistor, which has a channel-etched structure, includes the gate electrode layer 511, the gate insulating layer 507 over the gate electrode layer 511, the island-shaped oxide semiconductor layer 531 which is over the gate insulating layer 507 and overlaps with the gate electrode layer 511, and a pair of the source electrode layer 515a and the drain electrode layer 515b formed over the island-shaped oxide semiconductor layer 531.

When a silicon oxide layer having a lot of defects is used as the first insulating layer 516, heat treatment after formation of the silicon oxide layer has an effect of diffusing impurities such as hydrogen, moisture, a hydroxyl group, or hydride contained in the oxide semiconductor layer to the oxide insulating layer so that the impurities contained in the oxide semiconductor layer can be further reduced.

In addition, when a silicon oxide layer containing excessive oxygen is used as the first insulating layer 516, oxygen in the first insulating layer 516 is moved to the oxide semiconductor layer 531 by heat treatment performed after the formation of the first insulating layer 516, so that the oxygen concentration in the oxide semiconductor layer 531 can be improved and the oxide semiconductor layer 531 can be highly purified.

The second insulating layer 506 serving as a protective insulating layer may be formed over the first insulating layer 516. As the second insulating layer 506, for example, a silicon nitride film is formed by an RF sputtering method. Since an RF sputtering method has high productivity, it is preferably used as a film formation method of the protective insulating layer. As the protective insulating layer, an inorganic insulating film which does not contain impurities such as moisture and blocks the entry of the impurities from the outside is used; for example, a silicon nitride film, an aluminum nitride film, or the like is used. It is particularly effective to use a silicon nitride film and an aluminum nitride film as barrier films against hydrogen ions or hydrogen atoms, and either of these is preferably formed over the first insulating layer 516. In this embodiment, the second insulating layer 506 is formed using a silicon nitride film (see FIG. 13E).

In this embodiment, as the second insulating layer 506, a silicon nitride film is formed by heating the substrate 505 over which layers up to the first insulating layer 516 are formed, to a temperature of 100° C. to 400° C., introducing a sputtering gas containing high-purity nitrogen from which hydrogen and moisture are removed, and using a target of silicon semiconductor. In this case, the second insulating layer 506 is preferably deposited while removing moisture remaining in a treatment chamber, as in the case of the first insulating layer 516.

After the formation of the protective insulating layer, heat treatment may be further performed at higher than or equal to 100° C. and lower than or equal to 200° C. for longer than or equal to 1 hour and shorter than or equal to 30 hours in the air. This heat treatment may be performed at a fixed heating temperature. Alternatively, the following change in the heating temperature may be conducted plural times repeatedly: the heating temperature is increased from room temperature to a temperature higher than or equal to 100° C. and lower than or equal to 200° C. and then decreased to room temperature.

Oxygen-dope treatment may be performed on the oxide semiconductor film 530 and/or the gate insulating layer 507. "Oxygen doping" is addition of oxygen (which includes at least one of an oxygen radical, an oxygen atom, and an oxygen ion) to a bulk. Note that the term "bulk" is used in order to clarify that oxygen is added not only to a surface of a thin film but also to the inside of the thin film. In addition, "oxygen doping" includes "oxygen plasma doping" in which oxygen which is made to be plasma is added to a bulk.

The oxygen plasma-dope treatment may be either a method by which oxygen which is made to be plasma by inductively coupling plasma (ICP) is added or a method by which oxygen which is made to be plasma with the use of a microwave whose frequency is 1 GHz or higher (e.g., a frequency of 2.45 GHz) is added.

<7. Third Insulating Layer>

A third insulating layer for planarization may be provided over the first insulating layer 516 (the second insulating layer 506 in the case where the second insulating layer 506 is stacked). Note that for the third insulating layer, a resin material such as polyimide, acrylic, benzocyclobutene, polyamide, or epoxy can be used. Other than such resin materials, it is also possible to use a low-dielectric constant material (a low-k material), a siloxane-based resin, phosphosilicate glass (PSG), borophosphosilicate glass (BPSG), or the like. Note that a third insulating layer may be formed by stacking a plurality of insulating films formed using the above materials. The method for the formation of the third insulating layer is not limited to a particular method, and the following method or means can be used depending on the material: a sputtering method, an SOG method, spin coating, dip coating, spray coating, a droplet discharge method (an inkjet method), or a printing method (e.g., screen printing or offset printing); a doctor knife, a roll coater, a curtain coater, a knife coater, or the like.

In the transistor described in this embodiment, a channel formation region includes a highly-purified oxide semiconductor layer and current (off-state current) in an off state is sufficiently small.

Therefore, when the transistor is used in any of the rectifier circuits described in Embodiments 1 to 3, a rectifier circuit of which a loss and a voltage drop due to the threshold voltage of the transistor are suppressed can be provided. Further, a rectifier circuit of which a loss and variations in an output voltage are suppressed can be provided.

In addition, a semiconductor device which can operate even when power supplied from a contactless power feeding device is minute can be provided by using the rectifier circuit described in this embodiment. Further, a semiconductor device which stably operates even in the case where the amplitude of AC voltage supplied from a contactless power feeding device varies greatly can be provided.

Example 1

In this example, results of computer verification of characteristics of a rectifier circuit of one embodiment of the present invention will be described. As an analog circuit simulator, software (product name: SmartSpice) made by Silvaco Inc. was used.

In addition, in this example, characteristics of a rectifier circuit 1 having the circuit illustrated in FIG. 4A, a rectifier circuit 2 having the circuit illustrated in FIG. 8, a rectifier circuit 3 having the circuit illustrated in FIG. 9, and a comparison circuit having the circuit illustrated in FIG. 1A were examined.

<Rectifier Circuit 1>

The rectifier circuit 1 has the structure illustrated in FIG. 4A.

Figure 10:
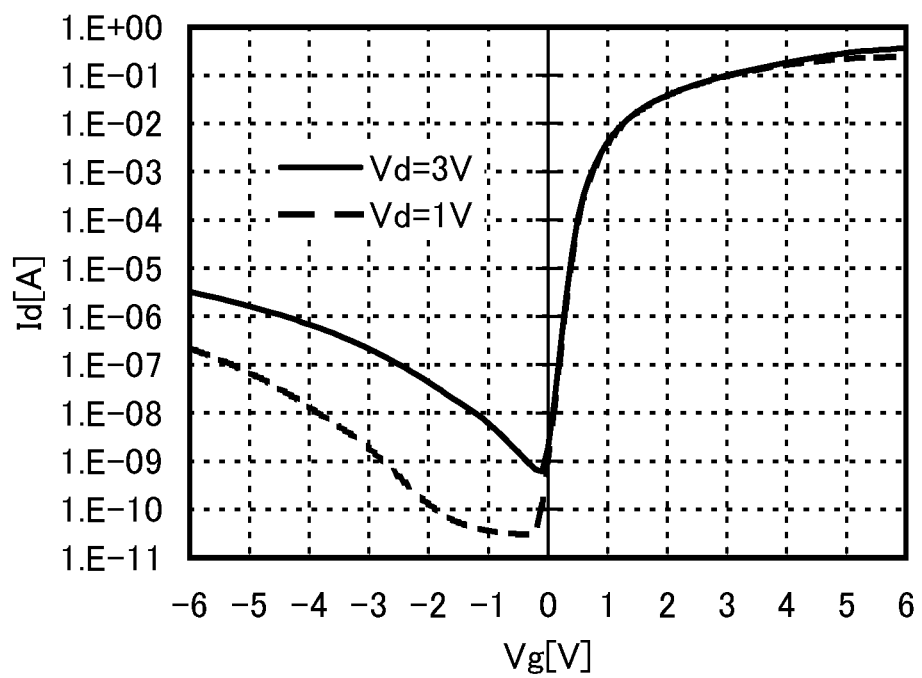
FIG. 10 shows Id-Vg characteristics of a transistor according to one example.

The first transistor 201, the second transistor 202, the third transistor 203, and the fourth transistor 204, which have the same characteristics, were used. When the characteristics of the transistors were evaluated, as an example, a structure in which 25 transistors were connected in parallel was calculated using a computation model of the simulator (level 36), where a conductivity type was n-type, a channel length L was 1.5 μm, a channel width W was 20 μm, and the thickness of a gate insulating film was 10 nm. The calculated Vg-Id characteristics of the transistors are shown in FIG. 10.

The capacitance of each of the first capacitor 211, the second capacitor 212, and the fourth capacitor 214 was 100 pF, and the capacitance of the third capacitor 213 was 1 nF.

A resistor of 20 kΩ was connected as a load circuit to the rectifier circuit 1. Note that the load corresponds to a circuit in which a current of 50 μA flows when the output voltage is 1 V.

Figure 11:
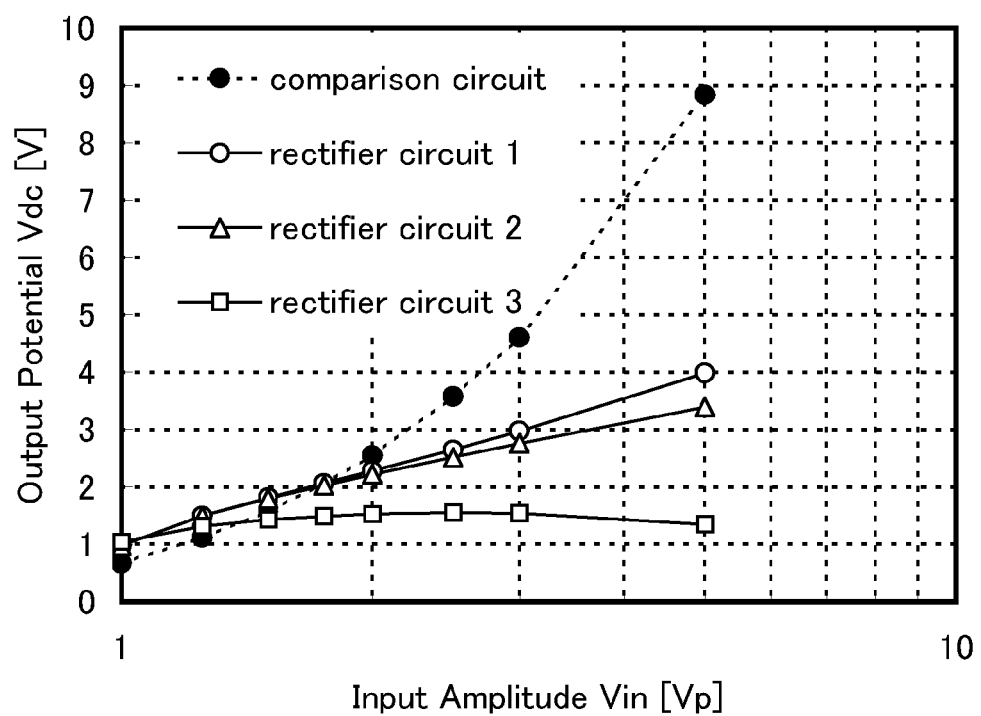
FIG. 11 shows characteristics of a rectifier circuit according to one example.

Further, after 40 μsec after the input of a signal of 13.56 MHz with respect to the amplitude Vin to the first terminal 61 and the second terminal 62, the potential of the fourth terminal 64, namely, the output potential Vdc was calculated. FIG. 11 shows a graph in which the output potential Vdc was plotted with respect to the input amplitude Vin.

<Rectifier Circuit 2>

The rectifier circuit 2 has the structure illustrated in FIG. 8.

The first transistor 201, the second transistor 202, the third transistor 203, the fourth transistor 204, the fifth transistor 225, the sixth transistor 226, the seventh transistor 227, the eighth transistor 228, the ninth transistor 229, and the tenth transistor 230 which have the same characteristics as the transistors in the rectifier circuit 1 were used. The description of the rectifier circuit 1 is referred to for detailed description of the transistors which were used.

The capacitance of each of the first capacitor 211, the second capacitor 212, and the fourth capacitor 214 was 100 pF, and the capacitance of the third capacitor 213 was 1 nF.

A resistor of 20 kΩ was connected as a load circuit to the rectifier circuit 2. Note that the load corresponds to a circuit in which a current of 50 μA flows when the output voltage is 1 V.

Further, after 40 μsec after the input of a signal of 13.56 MHz with respect to the amplitude Vin to the first terminal 61 and the second terminal 62, the potential of the fourth terminal 64, namely, the output potential Vdc was calculated. FIG. 11 shows a graph in which the output potential Vdc was plotted with respect to the input amplitude Vin.

<Rectifier Circuit 3>

The rectifier circuit 3 has the structure illustrated in FIG. 9.

The first transistor 201, the second transistor 202, the third transistor 203, the fourth transistor 204, and the fifth transistor 205 which have the same characteristics as the transistors in the rectifier circuit 1 were used. The description of the rectifier circuit 1 is referred to for detailed description of the transistors which were used.

The capacitance of each of the first capacitor 211, the second capacitor 212, and the fourth capacitor 214 was 100 pF, and the capacitance of the third capacitor 213 was 1 nF.

A resistor of 20 kΩ was connected as a load circuit to the rectifier circuit 3. Note that the load corresponds to a circuit in which a current of 50 μA flows when the output voltage is 1 V.

Further, after 40 μsec after the input of a signal of 13.56 MHz with respect to the amplitude Vin to the first terminal 61 and the second terminal 62, the potential of the fourth terminal 64, namely, the output potential Vdc was calculated. FIG. 11 shows a graph in which the output potential Vdc was plotted with respect to the input amplitude Vin.

<Comparison Circuit>

The comparison circuit has the structure illustrated in FIG. 1A.

The first transistor 101, the second transistor 102, the third transistor 103, and the fourth transistor 104 which have the same characteristics as the transistors in the rectifier circuit 1 were used. The description of the rectifier circuit 1 is referred to for detailed description of the transistors which were used for the comparison circuit.

The capacitance of each of the first capacitor 111, the second capacitor 112, and the fourth capacitor 114 was 100 pF, and the capacitance of the third capacitor 113 was 1 nF.

A resistor of 20 kΩ was connected as a load circuit to the comparison circuit. Note that the load corresponds to a circuit in which a current of 50 μA flows when the output voltage is 1 V.

Further, after 40 μsec after the input of a signal of 13.56 MHz with respect to the amplitude Vin to the first terminal 51 and the second terminal 52, the potential of the fourth terminal 54, namely, the output potential Vdc was calculated. FIG. 11 shows a graph in which the output potential Vdc was plotted with respect to the input amplitude Vin.

<Evaluation Results>

The rectifier circuit 1 has a higher output voltage than the comparison circuit in the range where the input amplitude Vin is minute (specifically, greater than or equal to 1 V and less than 1.8 V). From the result, it can be said that the rectifier circuit 1 is a rectifier circuit of which the drop in the output voltage by the threshold voltage of the transistor is suppressed. Further, an increase of the output potential Vdc of the rectifier circuit 1 is suppressed more than that of the comparison circuit in a region where the input amplitude Vin is large (specifically, greater than or equal to 1.8 V). From the result, it can be said that the rectifier circuit 1 is a rectifier circuit in which the output potential Vdc is stable.

The rectifier circuit 2 has a higher output voltage than the comparison circuit in the range where the input amplitude Vin is minute (specifically, greater than or equal to 1 V and less than 1.8 V). From the result, it can be said that the rectifier circuit 2 is a rectifier circuit of which the drop in the output voltage by the threshold voltage of the transistor is suppressed. Further, an increase of the output potential Vdc of the rectifier circuit 2 is suppressed more than those of the comparison circuit and the rectifier circuit 1 in a region where the input amplitude Vin is large (specifically, greater than or equal to 1.8 V). From the result, it can be said that the rectifier circuit 2 is a rectifier circuit in which the output potential Vdc is stable.

The rectifier circuit 3 has a higher output voltage than the comparison circuit in the range where the input amplitude Vin is minute (specifically, greater than or equal to 1 V and less than 1.4 V). From the result, it can be said that the rectifier circuit 3 is a rectifier circuit of which the drop in the output voltage by the threshold voltage of the transistor is suppressed. Further, an increase of the output potential Vdc of the rectifier circuit 3 is suppressed more than those of the comparison circuit, the rectifier circuit 1, and the rectifier circuit 2 in a region where the input amplitude Vin is large (specifically, greater than or equal to 1.4 V). From the result, it can be said that the rectifier circuit 3 is a rectifier circuit in which the output potential Vdc is stable.

This application is based on Japanese Patent Application serial no. 2010-215030 filed with Japan Patent Office on Sep. 27, 2010, the entire contents of which are hereby incorporated by reference.

What is claimed is:

1. A rectifier circuit comprising:
    a first transistor whose gate electrode is connected to a second node, whose first electrode is connected to a first node, and whose second electrode is connected to a second terminal;
    a second transistor whose gate electrode is connected to the first node, whose first electrode is connected to the second node, and whose second electrode is connected to a first terminal;
    a third transistor whose gate electrode is connected to the first node, whose first electrode is connected to a third node, and whose second electrode is connected to the first node;
    a first capacitor whose first electrode is connected to the first terminal and whose second electrode is connected to the first node; and
    a second capacitor whose first electrode is connected to the second terminal and whose second electrode is connected to the second node,
    wherein the first transistor, the second transistor, and the third transistor are n-channel enhancement transistors, and
    wherein AC voltage input to the first terminal and the second terminal is rectified to DC voltage and the DC voltage is output to the third node.

2. The rectifier circuit according to claim 1,
    wherein each of the first transistor, the second transistor, and the third transistor comprises:
        a gate electrode in contact with one surface of a gate insulating layer;
        an oxide semiconductor layer that is in contact with the other surface of the gate insulating layer and is overlapped with the gate electrode;
        a source electrode and a drain electrode, which are in contact with the oxide semiconductor layer and include end portions that overlap with the gate electrode; and
        an oxide insulating layer that is in contact with the oxide semiconductor layer and is overlapped with a channel formation region.

3. The rectifier circuit according to claim 1, further comprising:
    a first limiting circuit provided between the first terminal and the first node; and
    a second limiting circuit provided between the second terminal and the second node.

4. An RFID tag comprising the rectifier circuit according to claim 1.

5. A rectifier circuit comprising:
    a first transistor whose gate electrode is connected to a second node, whose first electrode is connected to a first node, and whose second electrode is connected to a second terminal;
    a second transistor whose gate electrode is connected to the first node, whose first electrode is connected to the second node, and whose second electrode is connected to a first terminal;
    a third transistor whose gate electrode is connected to the first node, whose first electrode is connected to a third node, and whose second electrode is connected to the first node;
    a fourth transistor whose gate electrode is connected to the third node, whose first electrode is connected to a fourth terminal, and whose second electrode is connected to the third node;
    a first capacitor whose first electrode is connected to the first terminal and whose second electrode is connected to the first node;
    a second capacitor whose first electrode is connected to the second terminal and whose second electrode is connected to the second node;
    a third capacitor whose first electrode is connected to the fourth terminal and whose second electrode is grounded; and
    a fourth capacitor whose first electrode is connected to the second node and whose second electrode is connected to the third node,
    wherein the first transistor, the second transistor, the third transistor, and the fourth transistor are n-channel enhancement transistors, and
    wherein AC voltage input to the first terminal and the second terminal is rectified to DC voltage and the DC voltage is output to the fourth terminal.

6. The rectifier circuit according to claim 5,
    wherein each of the first transistor, the second transistor, the third transistor, and the fourth transistor comprises:
        a gate electrode in contact with one surface of a gate insulating layer;
        an oxide semiconductor layer that is in contact with the other surface of the gate insulating layer and is overlapped with the gate electrode;
        a source electrode and a drain electrode, which are in contact with the oxide semiconductor layer and include end portions that overlap with the gate electrode; and
        an oxide insulating layer that is in contact with the oxide semiconductor layer and is overlapped with a channel formation region.

7. The rectifier circuit according to claim 5, further comprising:
    a first limiting circuit provided between the first terminal and the first node; and
    a second limiting circuit provided between the second terminal and the second node.

8. An RFID tag comprising the rectifier circuit according to claim 5.

9. A rectifier circuit comprising:
    a first transistor whose gate electrode is connected to a second node, whose first electrode is connected to a first node, and whose second electrode is connected to a second terminal;

a second transistor whose gate electrode is connected to the first node, whose first electrode is connected to the second node, and whose second electrode is connected to a first terminal;

a third transistor whose gate electrode is connected to the first node, whose first electrode is connected to a third node, and whose second electrode is connected to the first node;

a fourth transistor whose gate electrode is connected to the third node, whose first electrode is connected to a fourth terminal, and whose second electrode is connected to the third node;

a fifth transistor whose gate electrode is connected to the third node, whose first electrode is connected to the second node, and whose second electrode is connected to the fourth terminal;

a first capacitor whose first electrode is connected to the first terminal and whose second electrode is connected to the first node;

a second capacitor whose first electrode is connected to the second terminal and whose second electrode is connected to the second node;

a third capacitor whose first electrode is connected to the fourth terminal and whose second electrode is grounded; and a fourth capacitor whose first electrode is connected to the second node and whose second electrode is connected to the third node, wherein the first transistor, the second transistor, the third transistor, the fourth transistor, and the fifth transistor are n-channel enhancement transistors, and wherein AC voltage input to the first terminal and the second terminal is rectified to DC voltage and the DC voltage is output to the fourth terminal.

10. The rectifier circuit according to claim 9, wherein each of the first transistor, the second transistor, the third transistor, the fourth transistor, and the fifth transistor comprises:

a gate electrode in contact with one surface of a gate insulating layer;

an oxide semiconductor layer that is in contact with the other surface of the gate insulating layer and is overlapped with the gate electrode;

a source electrode and a drain electrode, which are in contact with the oxide semiconductor layer and include end portions that overlap with the gate electrode; and an oxide insulating layer that is in contact with the oxide semiconductor layer and is overlapped with a channel formation region.

11. An RFID tag comprising the rectifier circuit according to claim 9.

* * * * *